US012636134B2

(12) United States Patent
Gandrud et al.

(10) Patent No.: US 12,636,134 B2
(45) Date of Patent: May 26, 2026

(54) AUTOMATED CREATION OF TOOTH RESTORATION DENTAL APPLIANCES

(71) Applicant: Solventum Intellectual Properties Company, Maplewood, MN (US)

(72) Inventors: Jonathan D. Gandrud, Woodbury, MN (US); James D. Hansen, White Bear Lake, MN (US); Joseph C. Dingeldein, Hudson, WI (US); Alexandra R. Cunliffe, St. Paul, MN (US); Jaime B. Willoughby, Shoreview, MN (US); Christopher R. Kokaisel, Woodbury, MN (US); John M. Pilgrim, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 21 days.

(21) Appl. No.: 17/609,619

(22) PCT Filed: May 20, 2020

(86) PCT No.: PCT/IB2020/054778
§ 371 (c)(1),
(2) Date: Nov. 8, 2021

(87) PCT Pub. No.: WO2020/240351
PCT Pub. Date: Dec. 3, 2020

(65) Prior Publication Data
US 2022/0218452 A1      Jul. 14, 2022

Related U.S. Application Data

(60) Provisional application No. 62/855,587, filed on May 31, 2019.

(51) Int. Cl.
*A61C 13/34* (2006.01)
*A61C 13/00* (2006.01)
(Continued)

(52) U.S. Cl.
CPC .......... *A61C 13/34* (2013.01); *A61C 13/0004* (2013.01); *G06T 7/62* (2017.01);
(Continued)

(58) Field of Classification Search
CPC ............................... A61C 7/002; G06T 17/00
See application file for complete search history.

(56) References Cited

U.S. PATENT DOCUMENTS 6,776,614 B2    8/2004    Wiechmann
8,753,114 B2    6/2014    Vuillemot
(Continued)

FOREIGN PATENT DOCUMENTS

CN        102016854 A      4/2011
CN        103501727 A      1/2014
(Continued)

OTHER PUBLICATIONS

"Orthodontic Treatment as Restorative Dentistry." Belmar Orthodontics, Oct. 11, 2018, www.https://www.belmarorthodontics.com/orthodontic-treatment-as-restorative-dentistry/ (Year: 2018).*
(Continued)

*Primary Examiner* — Ryan McCulley

(57) ABSTRACT

Techniques are described for automating the design and manufacture a dental restoration appliance for restoring the dental anatomy of a patient. For example, a system processes a digital three-dimensional (3D) model of a future (desired) dental anatomy of a patient, the future dental anatomy representing an intended shape of at least one tooth of the patient. The system includes a landmark identifier configured to automatically compute, based on the digital 3D model of the future dental anatomy of the patient, one or more landmarks of the future dental anatomy of the patient. The system also includes a custom feature generator configured to automatically generate, based on the one or more
(Continued)

landmarks, one or more custom appliance features for a dental appliance for restoring the at least one tooth of the patient. The system further includes a memory device configured to store a digital model of the dental appliance.

19 Claims, 18 Drawing Sheets

(51) Int. Cl.
| | |
|---|---|
| *G06T 7/62* | (2017.01) |
| *G06T 17/20* | (2006.01) |
| *G06T 17/30* | (2006.01) |

(52) U.S. Cl.
CPC .............. *G06T 17/20* (2013.01); *G06T 17/30* (2013.01); *G06T 2207/30036* (2013.01); *G06T 2210/12* (2013.01)

(56) References Cited

U.S. PATENT DOCUMENTS

| | | | |
|---|---|---|---|
| 9,161,824 B2 | 10/2015 | Chishti | |
| 2006/0183082 A1 | 8/2006 | Quadling et al. | |
| 2008/0220395 A1 | 9/2008 | Marshall et al. | |
| 2008/0268400 A1* | 10/2008 | Moss ...................... | A61C 7/08 |
| | | | 433/24 |
| 2009/0148816 A1* | 6/2009 | Marshall .................. | A61C 5/77 |
| | | | 433/223 |
| 2013/0130202 A1* | 5/2013 | Vuillemot ............... | A61C 5/20 |
| | | | 433/213 |
| 2013/0218531 A1 | 8/2013 | Deichmann | |
| 2013/0325431 A1 | 12/2013 | See | |
| 2014/0067334 A1* | 3/2014 | Kuo ...................... | A61C 9/0046 |
| | | | 703/1 |
| 2016/0135925 A1 | 5/2016 | Mason | |
| 2017/0143454 A1* | 5/2017 | Yick ...................... | A61C 7/285 |
| 2017/0273763 A1 | 9/2017 | Fisker | |
| 2017/0312058 A1 | 11/2017 | Fisker | |
| 2018/0280116 A1 | 10/2018 | Hansen et al. | |
| 2019/0090984 A1* | 3/2019 | Martz ................... | C08G 61/08 |
| 2019/0223983 A1* | 7/2019 | Mah .................. | G06F 18/24323 |
| 2022/0012888 A1* | 1/2022 | Chen ...................... | G16H 30/20 |

FOREIGN PATENT DOCUMENTS

| | | | | | |
|---|---|---|---|---|---|
| CN | 104837435 A | 8/2015 | | | |
| CN | 106296802 A | 1/2017 | | | |
| CN | 107106260 A | 8/2017 | | | |
| CN | 107689077 A | * | 2/2018 | ............ | G06T 17/00 |
| CN | 108472105 A | 8/2018 | | | |
| CN | 109310488 A | 2/2019 | | | |
| CN | 109620431 A | 4/2019 | | | |
| WO | 2015031367 A2 | 3/2015 | | | |
| WO | WO 2015-031367 | 3/2015 | | | |

OTHER PUBLICATIONS

Machine translation of CN 107689077 (Year: 2018).*
International Search Report for PCT International Application No. PCT/IB2020/054778, mailed on Aug. 21, 2020, 4 pages.
Extended European Search Report, EP 20815123.3, Apr. 4, 2023, 3 pages.

* cited by examiner

FIG. 3

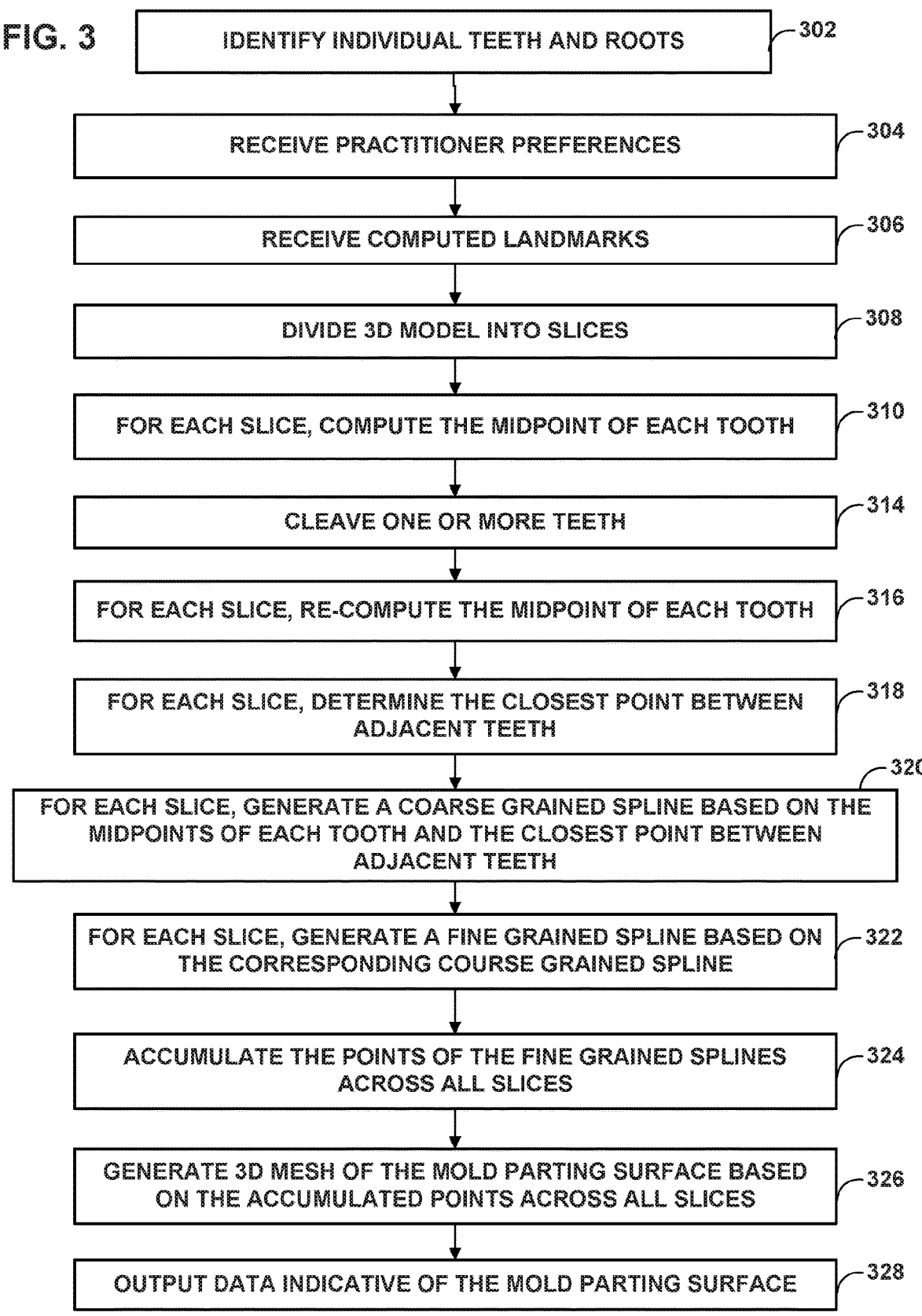

IDENTIFY INDIVIDUAL TEETH AND ROOTS — 302

RECEIVE PRACTITIONER PREFERENCES — 304

RECEIVE COMPUTED LANDMARKS — 306

DIVIDE 3D MODEL INTO SLICES — 308

FOR EACH SLICE, COMPUTE THE MIDPOINT OF EACH TOOTH — 310

CLEAVE ONE OR MORE TEETH — 314

FOR EACH SLICE, RE-COMPUTE THE MIDPOINT OF EACH TOOTH — 316

FOR EACH SLICE, DETERMINE THE CLOSEST POINT BETWEEN ADJACENT TEETH — 318

FOR EACH SLICE, GENERATE A COARSE GRAINED SPLINE BASED ON THE MIDPOINTS OF EACH TOOTH AND THE CLOSEST POINT BETWEEN ADJACENT TEETH — 320

FOR EACH SLICE, GENERATE A FINE GRAINED SPLINE BASED ON THE CORRESPONDING COURSE GRAINED SPLINE — 322

ACCUMULATE THE POINTS OF THE FINE GRAINED SPLINES ACROSS ALL SLICES — 324

GENERATE 3D MESH OF THE MOLD PARTING SURFACE BASED ON THE ACCUMULATED POINTS ACROSS ALL SLICES — 326

OUTPUT DATA INDICATIVE OF THE MOLD PARTING SURFACE — 328

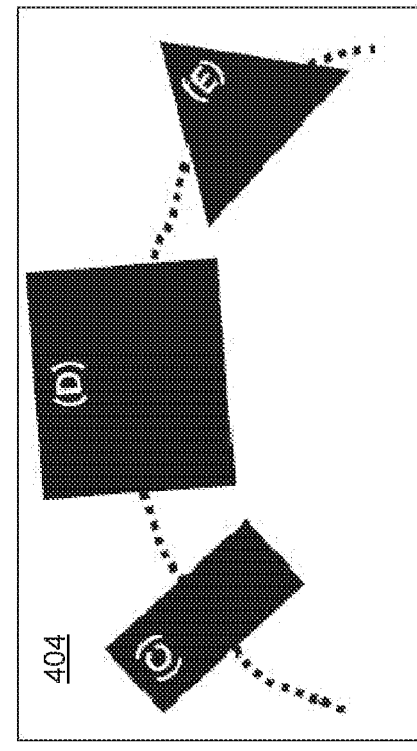
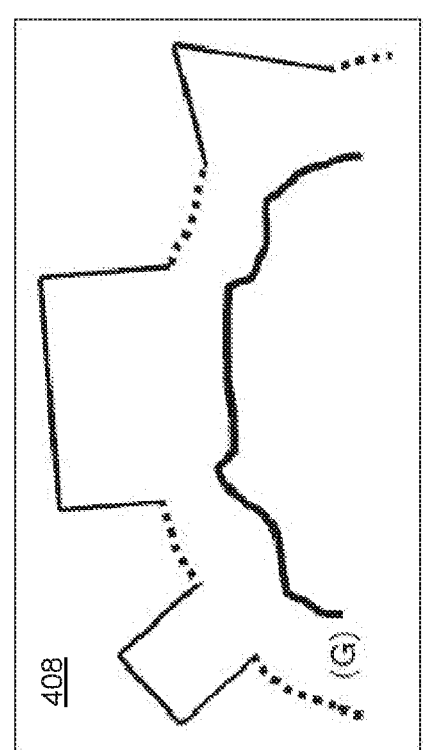
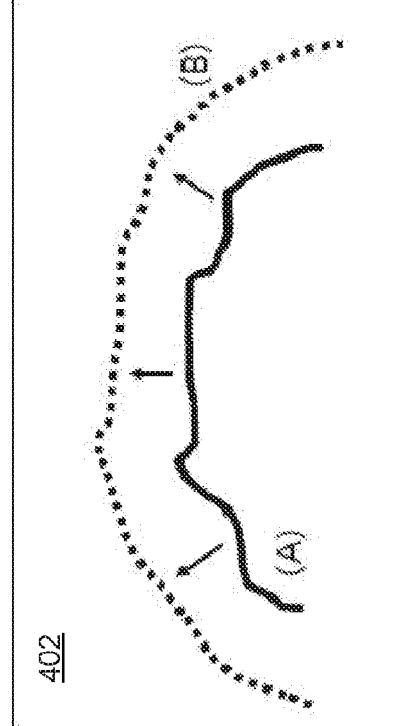
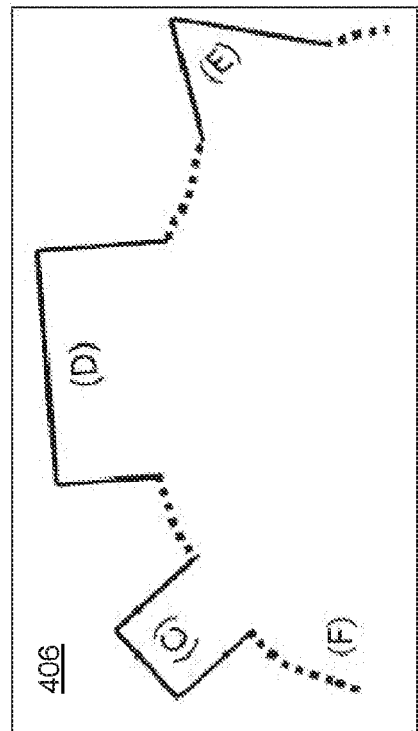
FIG. 4

1002

1002

1102

1202

1702A   1702B    1702C    1702D     1702E      1702F 1702A               1702F 1702B      1702C      1702D     1702E

1802

1902

AUTOMATED CREATION OF TOOTH RESTORATION DENTAL APPLIANCES

CROSS REFERENCE TO RELATED APPLICATIONS

This application is a national stage filing under 35 U.S.C. 371 of PCT/IB2020/054778, filed May 20, 2020, which claims the benefit of U.S. Provisional Application No. 62/855,587, filed May 31, 2019, the disclosures of which are incorporated by reference in their entireties herein.

TECHNICAL FIELD

The present disclosure relates to dental restoration appliances for re-shaping teeth.

BACKGROUND

Dental practitioners often utilize dental appliances to re-shape or restore a patient's dental anatomy. The dental appliance is typically constructed from a model of the patient's dental anatomy, augmented to a desired dental anatomy. The model may be a physical model or a digital model. Designing the dental appliance is often a manual, time-consuming and inexact process. For example, a practitioner typically designs a model of the dental appliance by trial and error. For instance, the practitioner may add, remove, rearrange, and/or re-size features until the practitioner is satisfied with the model of the dental appliance.

SUMMARY

The disclosure relates to techniques for automating the design and manufacture of a dental restoration appliance for restoring the dental anatomy of a patient. For example, a computing system is described that automatically analyzes a digital representation (model) of a future (i.e., desired) dental anatomy of a patient to generate a custom model of a patient-specific dental restoration appliance, which is used for manufacturing a corresponding physical appliance. As described herein, the computing system utilizes one or more digital libraries of predefined appliance "features," where each feature represents a digital 3D mesh defining a particular geometric shape to be utilized as one portion within an overall dental appliance. The computing system automates selecting and positioning/orienting a set of appliance features, based on detected landmarks of the dental anatomy, to define an overall dental restoration appliance. Moreover, the computing system may generate additional custom features (i.e., additional 3D meshes) at particular positions and orientations for the dental restoration appliance based on the landmarks. The computing system combines the custom features and the selected pre-defined features to automatically generate an overall 3D digital custom model which can be used to manufacture the patient-specific dental restoration appliance, such as by 3D printing the restoration appliance from the 3D custom model.

The techniques and practical applications described herein may provide certain advantages. For example, by automatically determining the shape and placement of various features (e.g., predefined features automatically selected from a library and automatically generated custom features) and combining those features to form an overall model of the dental appliance, a computing device may more quickly and/or more accurately generate a complete digital model of a patient-specific dental restoration appliance, than would be possible by a manual trial and error-based process. Creating a more accurate digital model of the dental appliance may improve the functionality and efficacy of the dental appliance, which may enable the dental practitioner to restore the patient's dental anatomy more quickly, more accurately, and/or more predictably. Restoring the patient's dental anatomy more quickly and/or more accurately may improve the functionality (e.g., reducing grinding or interference between teeth), which may improve the patient's quality of life, for example, by reducing pain caused by poor dental anatomy. In some examples, restoring the patient's dental anatomy more accurately may improve the appearance of the patient's dental anatomy, which may further improve the patient experience and/or quality of life. Further, by creating a quick and predictable process for restoring dental anatomy procedures with the custom device become efficient for a wider range of dental practitioners and affordable for a wider set of patients.

In one example, a system includes: a digital three-dimensional (3D) model of a future dental anatomy of a patient, the future dental anatomy representing an intended shape of at least one tooth of the patient; a landmark identifier configured to automatically compute, based on the digital 3D model of the future dental anatomy of the patient, one or more landmarks of the future dental anatomy of the patient; a custom feature generator configured to automatically generate, based on the one or more landmarks, one or more custom appliance features for a dental appliance for restoring the at least one tooth of the patient; and a memory device configured to store a digital model of the dental appliance, the digital model of the dental appliance including the one or more custom appliance features and one or more pre-defined appliance features.

In another example, a method includes: receiving, by a landmark identifier of a computing device, a digital three-dimensional (3D) model of a future dental anatomy of a patient, the future dental anatomy representing an intended shape of at least one tooth of the patient; automatically computing, by the landmark identifier, based on the digital 3D model of the future dental anatomy of the patient, one or more landmarks of the future dental anatomy of the patient; and storing, at a memory of the computing device, a digital model of the dental appliance, the digital model of the dental appliance including the one or more custom appliance features and one or more pre-defined appliance features.

In yet another example, a computer-readable storage medium includes instructions that, when executed, cause at least one processor of a computing device to: receive a digital three-dimensional (3D) model of a future dental anatomy of a patient, the future dental anatomy representing an intended shape of at least one tooth of the patient; automatically compute, based on the digital 3D model of the future dental anatomy of the patient, one or more landmarks of the future dental anatomy of the patient; and generate a digital model of a dental appliance for restoring the at least one tooth of the patient based on the one or more custom appliance features and one or more pre-defined appliance features.

The details of one or more examples are set forth in the accompanying drawings and the description below. Other features, objects, and advantages will be apparent from the description and drawings, and from the claims.

BRIEF DESCRIPTION OF THE FIGURES

FIG. 3 is a flow diagram illustrating an example technique for generating a mold parting surface, in accordance with various aspects of this disclosure.

FIG. 4 is a conceptual diagram illustrating an example technique for generating a digital model of a dental appliance, in accordance with various aspects of this disclosure.

DETAILED DESCRIPTION

Figure 1:
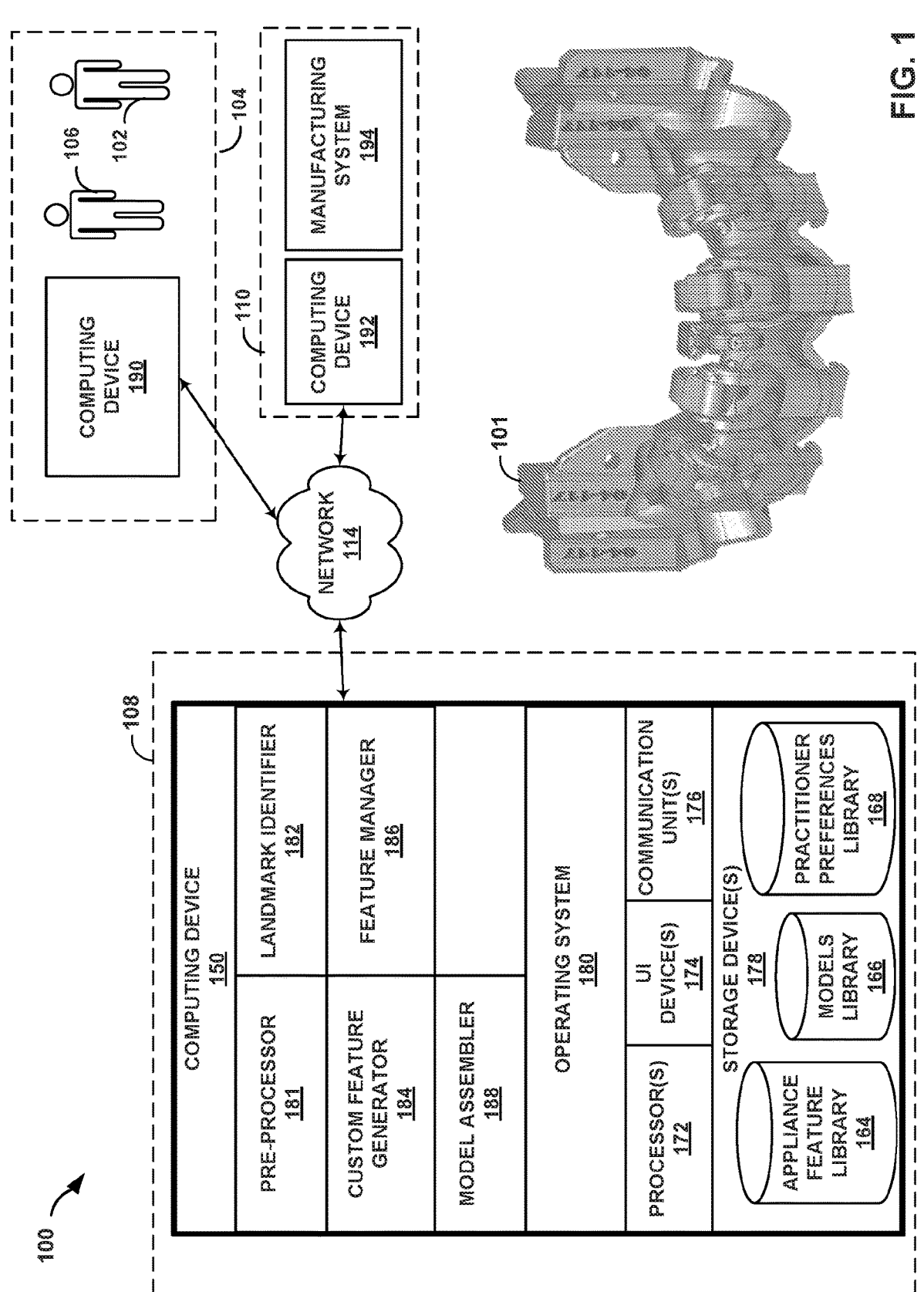
FIG. 1 is a block diagram illustrating an example system for automatically designing and manufacturing a dental appliance for restoring the dental anatomy of a patient, in accordance with various aspects of this disclosure.

FIG. 1 is a block diagram illustrating an example system for designing and manufacturing a dental appliance for restoring the dental anatomy of a patient, in accordance with various aspects of this disclosure. In the example of FIG. 1, system 100 includes clinic 104, appliance design facility 109, and manufacturing facility 110.

Practitioner 106 may treat patient 102 at clinic 104. For example, practitioner 106 may create a digital model of the current dental anatomy of patient 102. The dental anatomy may include any portion of crowns or roots of one or more teeth of a dental archform, gingiva, periodontal ligaments, alveolar bone, cortical bone, implants, artificial crowns, bridges, veneers, dentures, orthodontic appliances, or any structure that could be considered part of the dentition before, during, or after treatment. In one example, the digital model of the current dental anatomy includes a three-dimensional (3D) model of the current dental anatomy of the patient. The 3D model may be generated using an intra-oral scanner, Cone Beam Computed Tomography (CBCT) scanning (i.e., 3D X-ray), Optical Coherence Tomography (OCT), Magnetic Resonance Imaging (MRI), or any other 3D image capturing system. In some examples, computing device 190 stores a digital model of a current dental anatomy of patient 102.

Computing device 190 of clinic 104 may store a digital model of a future dental anatomy for the patient. The future dental anatomy represents the intended shape of the dental anatomy to be achieved by application of a dental appliance 101. In one example, practitioner 106 may create a physical model of the future dental anatomy and may utilize an image capturing system (e.g., as described above) to generate the digital model of the future dental anatomy. In another example, practitioner 106 may modify the digital model of the current anatomy of patient 102 (e.g., by adding material to a surface of one or more teeth of the dental anatomy) to generate the digital model of the future dental anatomy. In yet another example, computing device 190 may modify the digital model of the current dental anatomy to generate a model of the future dental anatomy.

In one scenario, computing device 190 outputs the digital model representing the dental anatomy (e.g., current and/or future) of patient 102 to another computing device, such as computing device 150 and/or computing device 192. As illustrated in FIG. 1, in some examples, computing device 150 of design facility 108, computing device 190 of clinic 104, and computing device 192 of manufacturing facility 110 may be communicatively coupled to one another via network 114. Network 114 may include a wired or wireless network, such as via WIFI®, BLUETOOTH®, 3G, 4G LTE, 5G, and the like.

In the example of FIG. 1, design facility 108 includes computing device 150 configured to automatically design a dental appliance for re-shaping the dental anatomy of patient 102. In one example, computing device 150 includes one or more processors 172, one or more user interface (UI) devices 174, one or more communication units 176, and one or more storage devices 178.

UI device 174 may be configured to receive user input and/or output information, also referred to as data, to a user of computing device 150. One or more input components of UI device 174 may receive input. Examples of input are tactile, audio, kinetic, and optical input, to name only a few examples. For example, UI device 174 may include a mouse, keyboard, voice responsive system, video camera, buttons, control pad, microphone 316, or any other type of device for detecting input from a human or machine. In some examples, UI device 174 may be a presence-sensitive input component, which may include a presence-sensitive screen, touch-sensitive screen, etc.

One or more output components of UI device 174 may generate output. Examples of output are data, tactile, audio, and video output. Output components of UI device 174, in some examples, include a display device (e.g., a presence-sensitive screen, a touch-screen, a liquid crystal display (LCD) display, a Light-Emitting Diode (LED) display, an optical head-mounted display (HMD), among others), a light-emitting diode, a speaker, or any other type of device for generating output to a human or machine.

Processor 172 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, storage device 178 may store program instructions (e.g., software instructions or modules) that are executed by processor 172 to carry out the techniques described herein. In other examples, the techniques may be executed by specifically programmed circuitry of processor 172. In these or other ways, processor 172 may be configured to execute the techniques described herein.

One or more storage devices 178 may store data for processing by processors 172. In some examples, storage device 178 is a temporary memory, meaning that a primary purpose of storage device 178 is not long-term storage. Storage device 178 may be configured for short-term storage of data as volatile memory and therefore not retain stored contents if deactivated. Examples of volatile memories include random access memories (RAM), dynamic random access memories (DRAM), static random access memories (SRAM), and other forms of volatile memories known in the art.

Storage device 178 may, in some examples, also include one or more computer-readable storage media. Storage device 178 may be configured to store larger amounts of data than volatile memory. Storage device 178 may further be configured for long-term storage of data as non-volatile memory space and retain data after activate/off cycles. Examples of non-volatile memories include, solid state drives (SSDs), hard disk drives (HDDs), flash memories, or forms of electrically programmable memories (EPROM) or electrically erasable and programmable (EEPROM) memories. Storage device 178 may store program instructions and/or data associated with software components 182-188 and/or operating system 180.

In the example of FIG. 1, storage device 178 includes appliance feature library 164, models library 166, and practitioner preferences library 168. Libraries 164, 166, and 168 may include relational databases, multi-dimensional databases, maps, and hash tables, or any data structure that stores data. In one example, models library 166 includes 3D models of the patient's current and/or future dental anatomy. In some instances, libraries 164, 166, and 168 may be stored locally at computing device 150 or may be accessed via a networked file share, cloud storage, or other remote data-store.

Computing device 150 may execute software components 182-188 with one or more processors 172. Computing device 150 may execute any of components 182-188 as or within a virtual machine executing on underlying hardware. In one example, any of components 182-188 may be implemented as part of operating system 180.

In accordance with the techniques of this disclosure, computing device 150 automatically or semi-automatically generates a digital model of dental appliance 101 for restoring the dental anatomy of patient 102 based on a digital model of the patient's future dental anatomy. Pre-processor 181 may pre-process the digital model of the future dental anatomy of patient 102. In one example, pre-processor 181 performs pre-processing to identify one or more teeth in the future dental anatomy of patient 102. In some instances, pre-processor 181 identify a local coordinate system for each individual tooth and may identify a global coordinate system that includes each tooth of the future dental anatomy. As another example, pre-processor 181 may pre-process the digital model of the future dental anatomy to identify the root structure of the dental anatomy. In another example, Pre-processor 181 may identify the gingiva. In this way, pre-processor 181 may determine portions of the future dental anatomy that include gingiva and portions of the future dental anatomy that include tooth. As yet another example, pre-processor 181 may pre-process the digital model of the future dental anatomy by extending the roots to identify the top surface of the root of each respective tooth.

Landmark identifier 182 may determine one or more landmarks of the future dental anatomy. Example landmarks include a slice, a midpoint, a gingival boundary, a closest point between two adjacent teeth (e.g., a point of contact between adjacent teeth or a point of closest approach (or closest proximity), a convex hull, a center of mass, or other landmark. A slice refers to a cross section of the dental anatomy. The midpoint of a tooth refers to a geometric center (also referred to as a geometrical midpoint) of the tooth within a given slice. The gingival boundary refers to a boundary between the gingiva and one or more teeth of the dental anatomy. A convex hull refers to a polygon whose vertices include a subset of the vertices in a given set of vertices, where the boundary of the subset of vertices circumscribes the entire set of vertices. The center of mass of a tooth refers to a midpoint, center point, centroid, or geometric center of the tooth. In some instances, landmark identifier 182 determines the landmarks in the local coordinate system for each tooth.

In some examples, landmark identifier 182 determines a plurality of slices of the patient's future dental anatomy. In one example, the thickness of each slice is the same. In some instances, the thickness of one or more slices is different than the thickness of another slice. The thickness of a given slice may be pre-defined. In one instance, landmark identifier 182 automatically determines the thickness of each slice. In another instance, the thickness of each slice may be user-defined.

Landmark identifier 182 determines, in some examples, a midpoint for each tooth. In one example, landmark identifier 182 determines a midpoint of a particular tooth by computing the extrema of the particular tooth's geometry based on the entirety of the particular tooth (e.g., without dividing the dental anatomy into slices) and determine the midpoint of the particular tooth based on the extrema of the tooth geometry.

In some examples, landmark identifier 182 determines a midpoint for each tooth for each slice. Landmark identifier 182 may determine the midpoint for a particular slice of a particular tooth by calculating the center of mass of a constellation of vertices around the edge of the particular tooth for that particular slice. In some instances, the midpoint of the particular tooth for the particular slice may be biased toward one edge of the tooth (e.g. in the case that one edge has more points than another edge).

In another example, landmark identifier 182 may determine the midpoint of a particular tooth in a particular slice based on a convex hull of the particular tooth for the particular slice. For example, landmark identifier 182 may determine a convex hull of a set of edge points of the tooth for a given slice. Landmark identifier 182 determines, in some instances, a geometric center from the convex hull by performing a flood-fill operation on the region circumscribed by the convex hull and computing a center of mass of the flood-filled convex hull.

In some examples, landmark identification module 182 determines a closest point between two adjacent teeth. The closest point between two adjacent teeth may be a point of contact or a point of closest approach. In one example, landmark identification module 182 determines a closest point between two adjacent teeth for each slice. In another example, landmark identification module 182 determines a closest point between two adjacent teeth based on the entirety of the adjacent teeth (e.g., without dividing the dental anatomy into slices).

Responsive to determining the landmarks of the future dental anatomy, in some examples, custom feature generator 184 generates one or more custom appliance features for dental appliance 101 based at least in part on the landmarks. For example, custom feature generator 184 may generate the custom appliance features by determining the characteristics of the custom appliance features, such as a size, shape, position, and/or orientation of the custom appliance features. Examples of custom appliance features include a spline, a mold parting surface, a gingival trim surface, a shell, a facial ribbon, a lingual shelf (also referred to as a "stiffening rib"), a door, a window, an incisal ridge, a case frame sparing, a diastema matrix wrapping, among others.

A spline refers to a curve that passes through a plurality of points or vertices, such as a piecewise polynomial parametric curve. A mold parting surface refers to a 3D mesh that bisects two sides of one or more teeth (e.g., separates the facial side of one or more teeth from the lingual side of the one or more teeth). A gingival trim surface refers to a 3D mesh that trims an encompassing shell along the gingival margin. A shell refers to a body of nominal thickness. In some examples, an inner surface of the shell matches the surface of the dental arch and an outer surface of the shell is a nominal offset of the inner surface. The facial ribbon refers to a stiffening rib of nominal thickness that is offset facially from the shell. A window refers to an aperture that provides access to the tooth surface so that dental composite can be placed on the tooth. A door refers to a structure that covers the window. An incisal ridge provides reinforcement at the incisal edge of dental appliance 101 and may be derived from the archform. The case frame sparing refers to connective material that couples parts of dental appliance 101 (e.g., the lingual portion of dental appliance 101, the facial portion of dental appliance 101, and subcomponents thereof) to the manufacturing case frame. In this way, the case frame sparing may tie the parts of dental appliance 101 to the case frame during manufacturing, protect the various parts from damage or loss, and/or reduce the risk of mixing-up parts.

In some examples, custom feature generator 184 generates one or more splines based on the landmarks. Custom feature generator 184 may generate a spline based on a plurality of tooth midpoints and/or closest points between adjacent teeth (e.g., points of contact between adjacent teeth or points of closest proximity between adjacent teeth). In some instances, custom feature generator 184 generates one spline for each slice. In one instance, custom feature generator 184 generates a plurality of splines for a given slice. For instance, custom feature generator 184 may generate a first spline for a first subset of teeth (e.g., right posterior teeth), a second spline for a second subset of teeth (e.g., left posterior teeth), and a third spline for a third subset of teeth (e.g., anterior teeth).

Custom feature generator 184 generates, in some scenarios, a mold parting surface based on the landmarks. The mold parting surface may be used to split an encompassing shell for molding without undercuts. In some examples, custom feature generator 184 generates additional copies of the mold parting surface. For example, custom feature generator 184 may place one or more copies of a mold parting surface at small offsets to the main parting surface for the purpose of creating an interference condition when the appliance is assembled (which may, for example, improve shape adaptation and sealing when applying a tooth restoration material to the teeth).

Appliance feature library 164 includes a set of pre-defined appliance features that may be included in dental appliance 101. Appliance feature library 164 may include a set of pre-defined appliance features that define one or more functional characteristics of dental appliance 101. Examples of pre-defined appliance features include vents, rear snap clamps, door hinges, door snaps, an incisal registration feature, center clips, custom labels, a manufacturing case frame, a diastema matrix handle, among others. Each vent is configured to enable excess dental composite to flow out of dental appliance 101. Rear snap clamps are configured to couple a facial portion of dental appliance 101 with a lingual portion of dental appliance 101. Each door hinge is configured to pivotably couple a respective door to dental appliance 101. Each door snap is configured to secure a respective door in a closed position. In some examples, an incisal registration feature comprises a male and female tab pair that falls on the incisal edge of dental appliance 101 (e.g., along the midsaggittal). In one example, the incisal registration feature is used to maintain vertical alignment of a facial portion of dental appliance 101 and a lingual portion of dental appliance 101. Each center clip is configured to provide vertical registration between the lingual portion of dental appliance 101 and the facial portion of dental appliance 101. Each custom label includes data identifying a part of dental appliance 101. The manufacturing case frame is configured to support one or more parts of dental appliance 101. For example, the manufacturing case frame may detachably couple a lingual portion of dental appliance 101 and a facial portion of dental appliance 101 to one another for safe handling and transportation of dental appliance 101 from manufacturing facility 110 to clinic 104.

Feature manager 186 determines the characteristics of one or more pre-defined appliance features that are included in pre-defined appliance feature library 164. In one example, the pre-defined appliance features are configured to perform functionality of dental appliance 101. The characteristics of the pre-defined appliance features may include the size, shape, scale, position, and/or orientation of the pre-defined appliance features. Feature manager 186 may determine the characteristics of the pre-defined appliance features based on one or more rules. The rules may be pre-programmed or machine generated, for instance, via machine learning.

Feature manager 186 determines, in some instances, a placement of a rear snap clamp based on the rules. In one example, feature manager 186 positions two rear snap clamps along the archform on opposite ends of the archform (e.g., a first snap clamp at one end and a second snap clamp at another end). In some examples, feature manager 186 positions the rear snap clamps one tooth beyond the outermost teeth to be restored. In some examples, feature manager 186 positions a female portion of the rear snap clamp on the lingual side of the parting surface and positions a male portion of the rear snap clamp on the facial side.

In some examples, feature manager 186 determines a placement of a vent based on the rules. In one example, feature manager 186 positions the vent at the midline of a corresponding door on the incisal side of dental appliance 101.

In some scenarios, feature manager 186 determines a placement of a door hinge based on the rules. In one scenario, feature manager 186 positions each door hinge at the midline of a corresponding door. In one scenario, feature manager 186 positions the female portion of the door hinge to anchor to the facial portion of dental appliance 101 (e.g., towards the incisal edge of a tooth) and positions the male portion of the door hinge to anchor to the outer face of the door.

In one instance, feature manager 186 determines a placement of a door snap based on the rules by positioning the door snap along a midline of a corresponding door. In one instance, feature manager 186 positions the female portion of the door snap to anchor to an outer face of the door and extends downward toward the gingiva. In another instance, feature manager 186 positions the male portion of the door snap to anchor to the gingival side of the facial ribbon. For instance, the door snap may secure the door in a closed position by latching the male portion of the door snap to the facial ribbon.

Feature manager 186 may determine the characteristics of a pre-defined appliance feature based on preferences of practitioner 102. Practitioner preferences library 168 may include data indicative of preferences of various practitioner 102. In one example, practitioner preferences directly affect the characteristics of one or more appliance features. For example, practitioner preferences library 168 may include data indicating a preferred size of various appliance features, such as the size of the vents. In such examples, larger vents may enable the pressure of the dental composite or resin to reach equilibration faster during the filling process but may result in a larger nub to finish after curing.

As another example, practitioner preferences indirectly affect the characteristics of appliance features. For example, practitioner preferences library 168 may include data indicating a preferred stiffness of the appliance or a preferred tightness of the self-clamping feature. Such preference selections may also affect more complex design changes to section thickness of the matrix and or degree of activation of the clamping geometry. Feature manager 186 may determine the characteristics of the appliance features by applying the practitioner preferences to one or more rules, a simulation (e.g. Monte Carlo) or finite element analysis. Features characteristics also may be derived from properties in the materials to used with the matrix, such as type of composite that the dentist prefers to use with the appliance.

Model assembler 188 generates a digital 3D model of dental appliance 101 used to re-shape the dental anatomy (e.g., to the future dental anatomy) in response to determining the characteristics of the custom and pre-defined appliance features. The digital model of dental appliance 101 may include a point cloud, 3D mesh, or other digital representation of dental appliance 101. In some instances, model assembler 188 stores the digital model of dental appliance 101 in models library 166.

Model assembler 188 may output the digital model of dental appliance 101. For example, model assembler 188 may output the digital model of dental appliance 101 to computing device 192 of manufacturing facility 110 (e.g., via network 114) to manufacture dental appliance 101. In another example, computing device 150 sends the digital model of dental appliance 101 to computing device 190 of clinic 104 for manufacturing at clinic 104.

Computing device 192 may send the digital model of dental appliance 101 to manufacturing system 194. Manufacturing system 194 manufactures dental appliance 101 according to the digital model of dental appliance 101. Manufacturing system 194 may form dental appliance 101 using any number of manufacturing techniques, such as 3D printing, chemical vapor deposition (CVD), thermoforming, injection molding, lost wax casting, milling, machining, laser cutting, among others.

Practitioner 106 may receive dental appliance 101 and may utilize dental appliance 101 to re-shape one or more teeth of patient 102. For example, practitioner 106 may apply a dental composite to the surface of one or more teeth of patient 102 via one or more doors of dental appliance 101. Excess dental composite may be removed via one or more vents.

In some examples, model assembler 188 generates a digital model of dental appliance 101 based on an existing digital model (e.g., stored in models library 166). In one example, models library 166 may include data indicative of appliance success criteria associated with each completed dental appliance 101, the appliance success criteria indicating a manufacturing print yield, practitioner and/or customer feedback or ratings, or a combination thereof. For example, model assembler 188 may utilize an existing digital model to generate a new or updated digital model of a dental appliance 101 in response to determining the appliance success criteria for the previous dental appliance 101 satisfy a threshold criteria (e.g., a threshold manufacturing yield, or a threshold practitioner rating). In one example, the existing digital model is a template or reference digital model. In such examples, model assembler 188 may generate a digital model of a dental appliance 101 based on the template digital model. For example, the template digital model may be associated with different characteristics of a potential patient's dental anatomy, such as the patient having small teeth or being unable to open the mouth widely.

In one example, model assembler 188 generates a digital model of a dental appliance 101 based on an existing digital model by utilizing one or more morphing algorithms. For example, model assembler 188 may utilize morphing algorithms to interpolate appliance feature geometries. In one instance, model assembler 188 may generate a new digital model of a dental appliance 101 based on the design of the existing digital model. In one instance, the design feature of an existing digital model may include a window inset from the perimeter, such that model assembler 188 may morph the geometry of the existing digital model based on landmarks for a different dental anatomy.

Techniques of this disclosure may enable a computing device to automatically determine the shape of dental appliance 101 and the placement of various appliance features. In this way, the computing device may more accurately and more quickly generate a digital model of a dental appliance 101. More accurately determining the shape of dental appliance 101 and the placement of the appliance features may increase the efficacy of dental appliance 101 and the tooth restoration. Determining the shape of dental appliance 101 and placement of the appliance features more quickly may enable the practitioner to correct a patient's teeth more quickly, which may improve the appearance and/or functionality of the patient's teeth, thereby potentially improving the patient experience. Additionally, reducing the time required to generate the digital model of a dental appliance 101 may reduce the cost of production and making treatment affordable for a wider set of patients.

While computing device 150 is described as automatically generating a digital model of dental appliance 101 based on a digital model of a future dental anatomy of the patient, in some examples, computing device 150 may utilize a digital model of the current, unrestored state of the dental anatomy of the patient to generate all or part of the digital model of dental appliance 101. For example, computing device 150 may utilize a digital model of the current dental anatomy to determine the position of snap clamps (which may be placed on teeth that are not to be restored) or generate the facial ribbon (e.g., as the gingival margin may not change during restoration).

Figure 2:
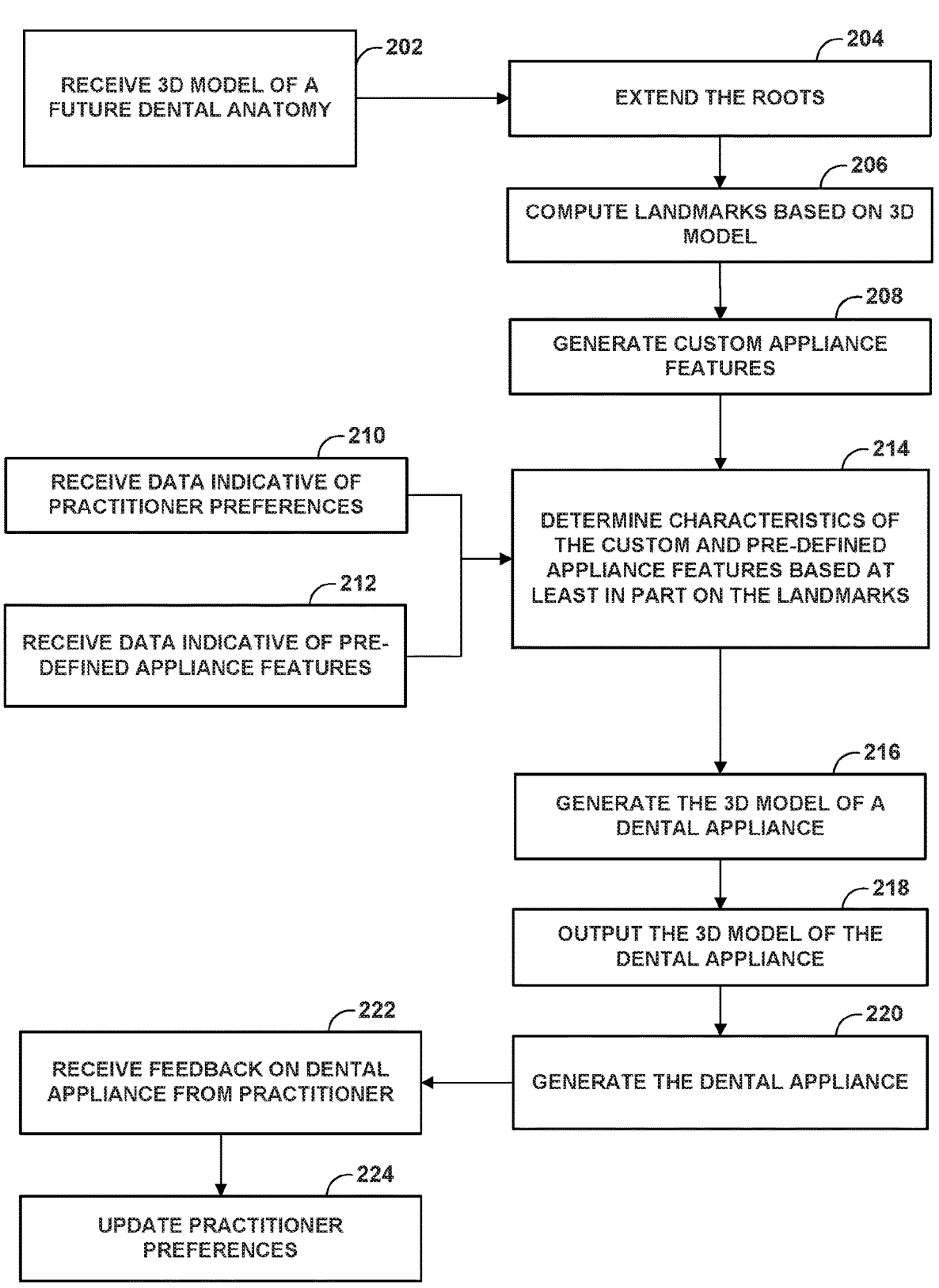
FIG. 2 is a flow diagram illustrating an example technique for generating a digital model of a dental appliance, in accordance with various aspects of this disclosure.

FIG. 2 is a flow diagram illustrating an example technique for generating a digital model of a dental appliance, in accordance with various aspects of this disclosure. FIG. 2 is described below in the context of system 100 of FIG. 1.

Computing device 150 receives a digital 3D model of a future (i.e., desired) dental anatomy for a patient 102. In one example, computing device 150 receives the digital model of the future dental anatomy from another computing device, such as computing device 190 of clinic 104. The digital model of the future dental anatomy of the patient may include a point cloud or 3D mesh of the future dental anatomy. A point cloud includes a collection of points that represent or define an object in 3-dimensional space. A 3D mesh includes a plurality of vertices (also referred to as points) and geometric faces (e.g., triangles) defined by the vertices. In one example, practitioner 106 creates a physical model of the future dental anatomy and utilizes an image capturing system to generate the digital model of the future dental anatomy. In another example, practitioner 106 modifies the digital model of the current anatomy of patient 102 (e.g., by adding material to a surface of one or more teeth of the dental anatomy) to generate the digital model of the future dental anatomy. In yet another example, computing device 190 may modify the digital model of the current dental anatomy to generate a model of the future dental anatomy.

In some examples, pre-processor 181 pre-processes the 3D model of the future dental anatomy to generate a modified model by digitally extending the roots of the initial digital model of the future dental anatomy according to the projected root extension determined by pre-processor 181, thereby more accurately modeling the complete anatomy of the patient's teeth (204). In some examples, because the tops (e.g., the area furthest the gingival emergence) of the roots may be at different heights, pre-processor 181 may detect the vertices corresponding to the tops of the roots and then project those vertices along a normal vector, thereby digitally extending the roots. In one example, pre-processor 181 groups vertices into clusters (e.g., using a k-means algorithm). Pre-processor 181 may compute the average normal vector for each cluster of vertices. For each cluster of vertices, pre-processor 181 may determine a sum of residual angular differences between the average normal vector for the cluster and the vector associated with each of the vertices in the cluster. In one example, pre-processor 181 determines which cluster of vertices is the top surface of the roots based on the sum of the residual angular differences for each cluster. For example, pre-processor 181 may determine that the cluster with the lowest sum of residual angular differences defines the top surface of the roots.

Further, landmark identifier 182 processes the 3D model of the future dental anatomy to automatically detect a set of one or more landmarks of the future dental anatomy, where each landmark represents an identifiable geometric construct within the 3D model that is useful for determining the position and orientation with respect to one or more tooth surfaces (206). In some examples, the landmarks computed by landmark identifier 182 include a plurality of slices of the dental anatomy and each slice of the dental anatomy may include one or more additional landmarks. For example, landmark identifier 182 may divide the 3D mesh of the future dental anatomy into a plurality of slices. Responsive to dividing the digital model of the dental anatomy into slices, in one example, landmark identifier 182 computes one or more landmarks for each slice, such as a midpoint for each tooth in the slice, a closest point between two adjacent teeth (e.g., a point of contact between two adjacent teeth or a point of closest approach between two adjacent teeth), a convex hull for each tooth in the slice, among others.

Custom feature generator 184 automatically generates, including determining the particular size, shape, position and orientation, one or more custom appliance features for dental appliance 101 based on the landmarks, where each "feature" represents a digital 3D mesh defining a particular geometric shape to be utilized as one portion (i.e., a sub-mesh) within a 3D model defining overall dental appliance (208). Examples of custom appliance features include a 3D mesh for a spline, a mold parting surface, a gingival trim surface, a shell, a facial ribbon, a lingual shelf, a door, a window, among others. In one example, custom feature generator 184 generates one or more digital meshes representing splines for each slice of the dental anatomy. Custom feature generator 184 may generate a spline for a given slice based on a plurality of tooth midpoints of teeth within the slice and/or closest points between adjacent teeth within the slice (e.g., points of contact between adjacent teeth within the slice or points of closest proximity between adjacent teeth within the slice). In other words, in this example, custom feature generator 184 accumulates a set of points (e.g., tooth midpoints, points of contact between adjacent teeth, points of closest approach between adjacent teeth, or a combination thereof) for each slice to generate features representing a spline for each digital slice.

In some examples, custom feature generator 184 automatically generates a mold parting surface as one example feature to be incorporated within an overall 3D model of a dental restoration appliance. Custom feature generator 184 may generate the mold parting surface based on the plurality of midpoints and/or closest points between adjacent teeth. For example, custom feature generator 184 may accumulate a plurality of the points for each spline for each slice to generate the mold parting surface. As one example, in an example where custom feature generator 184 divides the dental anatomy into four slices and generates a single spline for each slice, custom feature generator 184 aggregates the points of each of the four splines to generate the mold parting surface.

In one scenario, feature manager 186 receives data indicative of practitioner preferences (210). For instance, feature manager 186 may query practitioner preferences library 168 to determine preferences for practitioner 106. Examples of data stored within practitioner preferences library 186 include a preferred size or orientation of a pre-defined appliance feature for a particular practitioner.

Feature manager 186 receives data indicative of pre-defined appliance features, such as by accessing and retrieving the data from one or more libraries (e.g., datastore or other electronic repository) of 3D meshes representing pre-defined features for incorporation within an overall 3D model (212). For example, feature manager 186 may receive data by querying appliance feature library 164. Appliance feature library 164 stores data defining 3D meshes for a plurality of pre-defined appliance features, such as vents, rear snap clamps, door hinges, door snaps, an incisal registration feature (also referred to as a "beak"), among others.

In one example, feature manager 186 selects one or more pre-defined appliance features of a plurality of pre-defined appliance features stored within appliance feature library 186. For example, appliance feature library 186 may include data defining a plurality of different pre-defined appliance features of a given type of pre-defined appliance feature. As one example, appliance feature library 164 may include data defining different characteristics (e.g., size, shape, scale, orientation) for a given type of pre-defined appliance feature (e.g., data for differently sized and/or differently shaped doors, windows, hinges, etc.). In other words, appliance feature library 164 may determine the characteristics of a pre-defined appliance feature and select a feature from the pre-defined appliance library that corresponds to the determined characteristics. In some scenarios, feature manager 186 selects a pre-defined appliance feature (e.g., a particularly sized door hinge) from appliance feature library 186 based on landmarks for a corresponding tooth, characteristics (e.g., size, type, location) of the corresponding tooth (e.g., a tooth for which the appliance feature will be used to restore when the dental appliance is applied to the patient), practitioner preferences, or both.

In another example, appliance feature library 164 includes data defining a set of required pre-defined appliance features, such that feature manager 186 retrieves data for the 3D meshes representing the pre-defined features for each of the required pre-defined features. In such examples, feature manager 164 may transform the 3D mesh for including in the patient specific dental appliance. For example, feature manager 164 may rotate or scale (e.g., re-size) a 3D mesh for a particular feature based on the landmarks for a corresponding tooth, characteristics of the tooth, and/or practitioner preferences.

Model assembler 188 operates to construct an overall 3D mesh for the dental appliance by, for example, determining the characteristics of one or more custom appliance features and one or more pre-defined dental appliance features based at least in part on the patient-specific landmarks (214). For example, based on the landmarks for the particular patient, model assembler 188 may determine example characteristics such as a size, position, and/or orientation of each 3D mesh corresponding to each of the appliance features (e.g., custom or pre-defined appliance features) for the overall appliance. In one example, modeler assembler 188 may determine the position of a custom appliance feature based on the midpoint of a particular tooth. For example, modeler assembler 188 may align or otherwise position a 3D mesh of a window and/or door (as example features) based on a midpoint of the tooth. In this way, model assembler 188 may determine the position of a pre-defined appliance feature based on the landmarks. As one example, model assembler 188 may determine the position of a rear snap clamp based on the position of the teeth. In some instances, modeler assembler 188 determines the position of a pre-defined appliance feature based on the position of a custom appliance feature. For instance, modeler assembler 188 may align a door hinge, door snap, and/or vent with a midline of a door. Further, the model assembler 188 may adjust the feature geometry, scale or position based analysis of the overall model, such as performing a finite element analysis to adjust the active clamping forces of snap clamp. The model assembler 188 may also make adjustments based on subsequent expected manufacturing tolerances, such as providing suitable clearance between features. Similarly, the model assembler 188 may make adjustments based on the properties of the material used in the creation of the physical appliance, such as increasing thicknesses when using more flexible materials.

Model assembler 188 generates the full digital 3D model of the dental appliance 101 based on the custom dental appliance features and the pre-defined dental appliance features and their determined characteristics (216). The digital model of dental appliance 101 may include a point cloud, 3D mesh, or other digital representation of dental appliance 101.

Computing device 150 stores, transmits and/or outputs the digital 3D model of dental appliance 101 (218). For example, computing device 150 may output the digital 3D model of dental appliance 101 to computing device 192 of manufacturing facility 110. Manufacturing system 194 generates dental appliance 101 (220) based on the digital 3D model of dental appliance 101. For example, manufacturing system 194 may generate the physical dental appliance 101 via 3D printing, CVD, machining, milling, or any other suitable technique.

In some examples, computing system 150 receives feedback on dental appliance 101 from practitioner 106 (222). For example, after practitioner 106 receives the physical dental appliance 101, practitioner 106 may utilize computing device 190 to send feedback to computing device 150. As one example, computing device 150 may receive data indicating a request to adjust a characteristic (e.g., size, relative position) of a pre-defined appliance feature. In some examples, computing system 150 updates the practitioner preferences library 168 based on the feedback (224).

FIG. 3 is a flow diagram illustrating an example technique for generating a mold parting surface, in accordance with various aspects of this disclosure. FIG. 3 is described below in the context of system 100 of FIG. 1.

Pre-processor 181 receives a digital 3D model of a future dental anatomy for a patient 102. The digital model of the future dental anatomy of the patient may include a point cloud or 3D mesh of the future dental anatomy.

In some examples, pre-processor 181 of computing device 150 analyzes the digital model of the future dental anatomy to identify individual teeth and roots of the future dental anatomy (302). Pre-processor 181 may analyze the digital model of the future dental anatomy to extend the roots by finding the vertices on the top surface of the roots and then projecting those vertices along a normal vector, as described above.

Computing device 150 receives, in the example of FIG. 3, data indicative of practitioner preferences (304). Examples of practitioner preferences include a preferred size of a pre-defined appliance feature for a particular practitioner. For instance, feature manager 186 may receive data from practitioner preferences library 168.

In some scenarios, landmark identifier 182 receives data indicative of landmarks of the future dental anatomy (306). For example, computing device 180 may pre-determine one or more landmarks, for example, and may send data indicative of the landmarks to computing device 150 when sending the digital model of the future dental anatomy of patient 102.

Landmark identifier 182 automatically computes one or more landmarks of the future dental anatomy. In some examples, landmark identifier 182 divides the digital model of the future dental anatomy into a plurality of slices (308). In one example, the thickness of each slice is the same. In one example, the thickness of one or more slices is different than the thickness of another slice. The thickness of a given slice may be pre-defined or user-defined. In one example, landmark identifier 182 dynamically determines the thickness of each slice.

Landmark identifier 182 computes a geometric midpoint of each tooth for each slice of the plurality of slices (310). Landmark identifier 182 may determine the midpoint of a tooth for a particular slice by calculating the center of mass of the constellation of points around the edge of a tooth. In another example, landmark identifier 182 determines the midpoint of a tooth for a particular slice based on a convex hull of the tooth for that particular slice. In such examples, landmark identifier 182 determines a geometric center from the convex hull by performing a flood-fill operation on the region circumscribed by the convex hull and computing a center of mass of the flood-filled convex hull.

Landmark identifier 182 may cleave a portion of one or more teeth of the future dental anatomy (314). In one example, landmark identifier 182 cleaves one or more teeth (e.g., posterior and/or anterior teeth) to remove part (e.g., part of the lingual portion) of one or more teeth. Cleaving part of the lingual portion of the teeth may reduce or eliminate lingual cusp tips in the posterior teeth. In some examples, cleaving part of a tooth for a given slice may create additional vertices that define the edge of the tooth for that slice of the tooth.

Custom feature generator 184 re-computes the midpoint of each tooth for each slice (316). For example, custom feature generator 184 may re-compute the midpoint of each tooth in a manner similar to the techniques described above. In one example, custom feature generator 184 re-computes or updates the convex hull for a slice of a tooth based on the additional vertices created by cleaving the geometry of the tooth along a specified plane. For example, the updated convex hull may include the vertices created by cleaving the tooth, which may result in a smoother convex hull. In other words, the updated convex hull is less likely to have a degenerate shape, such that the slice of the tooth is more likely to be valid. In some instances, custom feature generator 184 re-computes or updates the midpoint of the tooth for the slice based on the updated convex hull.

In some examples, landmark identifier 182 computes a closest point between two adjacent teeth (e.g., a point of closest approach or a point of contact between each set of adjacent teeth) within each slice of the plurality of slices (318). For example, landmark identifier 182 may determine a distance between each point defining an edge of a first tooth and each point defining an edge of a second tooth adjacent to the first tooth. In such examples, landmark identifier 182 determines the closest point between the first and second teeth based on the distances between each set of points. For example, landmark identifier 182 may determine the closest point between adjacent teeth by calculating the center between a point on the edge of the first tooth and a point on the edge of the second tooth.

Custom feature generator 184 automatically generates one or more custom appliance features for dental appliance 101 based on the landmarks. In the example of FIG. 3, custom feature generator 184 generates one or more coarsely-grained splines for each slice of the future dental anatomy (320) based on the midpoints of each tooth and the closest points between adjacent teeth (e.g., a point of closest approach or a point of contact between adjacent teeth) for each slice. For example, custom feature generator 184 may accumulate a set of points (e.g., tooth midpoints, closest points between adjacent teeth, or a combination thereof) for each slice to generate a spline for each slice. In one example, custom feature generator 184 generates the spline by curve fitting the plurality of midpoints and/or closest points between adjacent teeth to a polynomial function. Responsive to determining the polynomial function that fits the midpoints and/or closest points, custom feature generator 184 may generate the points of the coarsely-grained spline by inputting a first series of values into the polynomial function to determine a corresponding output point (e.g., x, y coordinate) for each input value. In some examples, the difference between any two consecutive input values in the first series of input values is a fixed amount. In other words, the density of points in the coarsely-grained spline is a first density. Said another way, custom feature generator 186 determines a polynomial function that includes a plurality of landmark points (e.g., tooth midpoints, closest points between adjacent teeth) and interpolates between the landmark points using the polynomial function to generate a coarsely-grained spline defined by a first density of points.

In the example of FIG. 3, custom feature generator 184 generates a finely-grained spline for each slice based on the corresponding coarsely-grained spline (322). For example, custom feature generator 184 may generate the finely-grained spline by inputting a second series of values into the polynomial function defining the spline. In one example, the difference between each input value for the finely-grained spline is less than the difference between each input value for the coarsely-grained spline. In other words, the space between the points of the finely-grained spline is less than the space between points of the coarsely-grained spline, such that the density of the finely-grained spline is a second density that is greater than the density of the coarsely-grained spline.

Custom feature generator 184 generates, in some examples, accumulates the points for all of the finely-grained splines across all of the slices (324). In other words, custom feature generator 184 aggregates the points for each of the splines.

According to some scenarios, custom feature generator 184 generates a 3D mesh of the mold parting surface based on the accumulated points across all of the slices (326). In other words, custom feature generator 184 may utilize each of the points for each of the splines to create a 3D mesh of the mold parting surface.

Responsive to generating the mold parting surface, custom feature generator 184 may output data indicative of the mold parting surface (328). For example, custom feature generator 184 may output data indicative of the 3D mesh to model assembler 188 for constructing the digital model of dental appliance 101.

FIG. 4 is a conceptual diagram illustrating an example technique for generating a digital model of a dental appliance, in accordance with various aspects of this disclosure. FIG. 4 is described below in the context of system 100 of FIG. 1.

Model assembler 188 of computing device 150 may receive data indicative of one or more custom appliance features, one or more pre-defined appliance features, and the digital 3D model of the future dental anatomy of patient 102.

Model assembler 188 may identify an outer surface (B) of a dental appliance 101 based on the digital model of the future dental anatomy (402). For example, model assembler 188 may identify an input mesh (A) of the future dental anatomy based on the digital model of the future dental anatomy and apply an offset to the input mesh (A) to identify an outer surface (B) of dental appliance 101.

In the example of FIG. 4, model assembler 188 applies the one or more custom appliance features (C) and one or more pre-defined appliance features (D) and (E) to the outer surface (B) of dental appliance 101 (404). For example, model assembler 188 positions and orients features (C), (D), and (E) according to one or more rules. The rules may be pre-programmed or machine generated, for example, via machine learning.

Responsive to applying the custom appliance features (C) and pre-defined appliance features (D) and (E) to the outer surface (B) of dental appliance 101, model assembler 188 unions the outer surface (B) and appliance features (C), (D), and (E) to generate a unioned mesh (F) of dental appliance 101 (406).

Model assembler 188 subtracts the input mesh (A) from the unioned mesh (F) to generate the final digital model (G) of dental appliance 101 (408). Subtracting the input mesh (A) after generating unioned mesh (F) may enable model assembler 188 to automatically generate a digital model of dental appliance 101 such that none of appliance features (C), (D), or (E) protrude through dental appliance 101.

Figure 5:
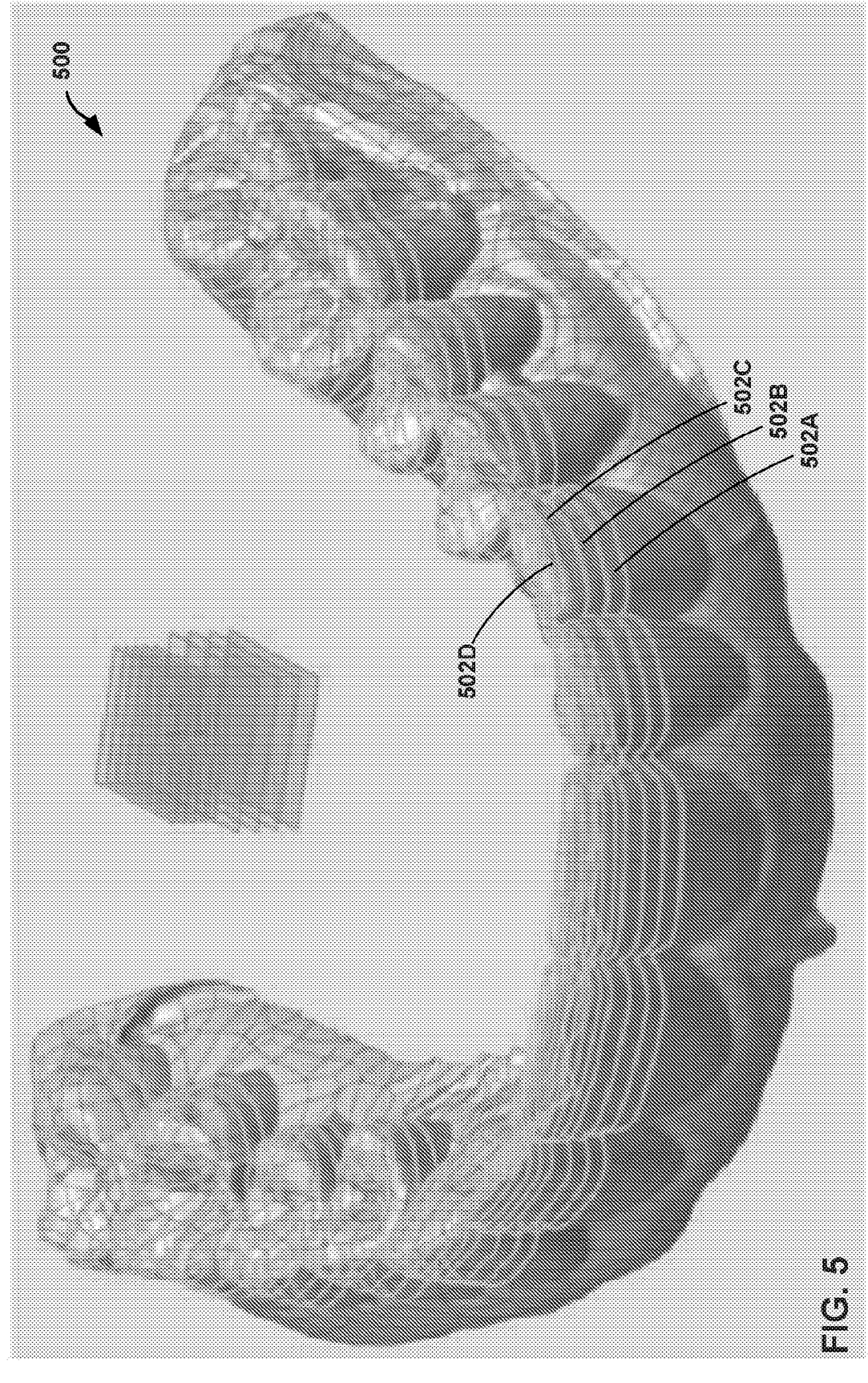
FIG. 5 is a conceptual diagram illustrating a plurality of slices of an example digital model of a dental anatomy, in accordance with various aspects of this disclosure.

FIG. 5 is a conceptual diagram illustrating a plurality of slices of an example digital model of a dental anatomy, in accordance with various aspects of this disclosure. FIG. 5 is described below in the context of system 100 of FIG. 1.

Landmark identifier 182 computes one or more landmarks of the future dental anatomy of patient 102 based on the digital model 500 of the future dental anatomy. In the example of FIG. 5, landmark identifier 182 computes the landmarks by dividing the digital model 500 into a plurality of slices 502A-502D (collectively, slices 502). In one example, the thickness of each slice is the same. In one example, the thickness of one or more slices is different than the thickness of another slice. The thickness of a given slice may be pre-defined or user-defined. In one example, landmark identifier 182 dynamically determines the thickness of each slice. While FIG. 5 is illustrated with four slices 502, landmark identifier 182 may divide the digital model into any number of slices 502.

Responsive to dividing the digital model of the future dental anatomy into slices, landmark identification 182 may determine whether the slice is valid. In some examples, landmark identification 182 determines whether the slice for the particular tooth is valid based on the area of a given slice of a particular tooth. In one example, landmark identification 182 determines the slice is a valid in response to determining the tooth slice area (e.g., an area of the tooth for a given slice) is one of the largest tooth slice areas for the slices of that tooth (e.g., the area of the tooth for a given slice is one of the three largest slices for that tooth). As another example, landmark identification 182 determines whether the slice for the particular tooth is valid based on the area of the particular slice and the area of the largest slice for the particular tooth. For example, landmark identification 182 may determine the slice is valid in response to determining the area of a particular tooth for the particular slice satisfies (e.g., is greater than or equal to) a threshold percentage (e.g., forty percent) of the area of the largest slice for that particular tooth.

In some instances, landmark identification 182 determines whether the slice is valid based on a length of respective portions of a convex hull of a particular tooth for a given slice. In one instance, landmark identification 182 determines a length of a line segment for a particular convex hull. Landmark identification 182 may determine the slice is invalid in response to determining the length of the particular line segment satisfies (e.g., is greater than or equal to) a threshold length (e.g., fifty percent of the length of the perimeter of the convex hull).

Figure 6:
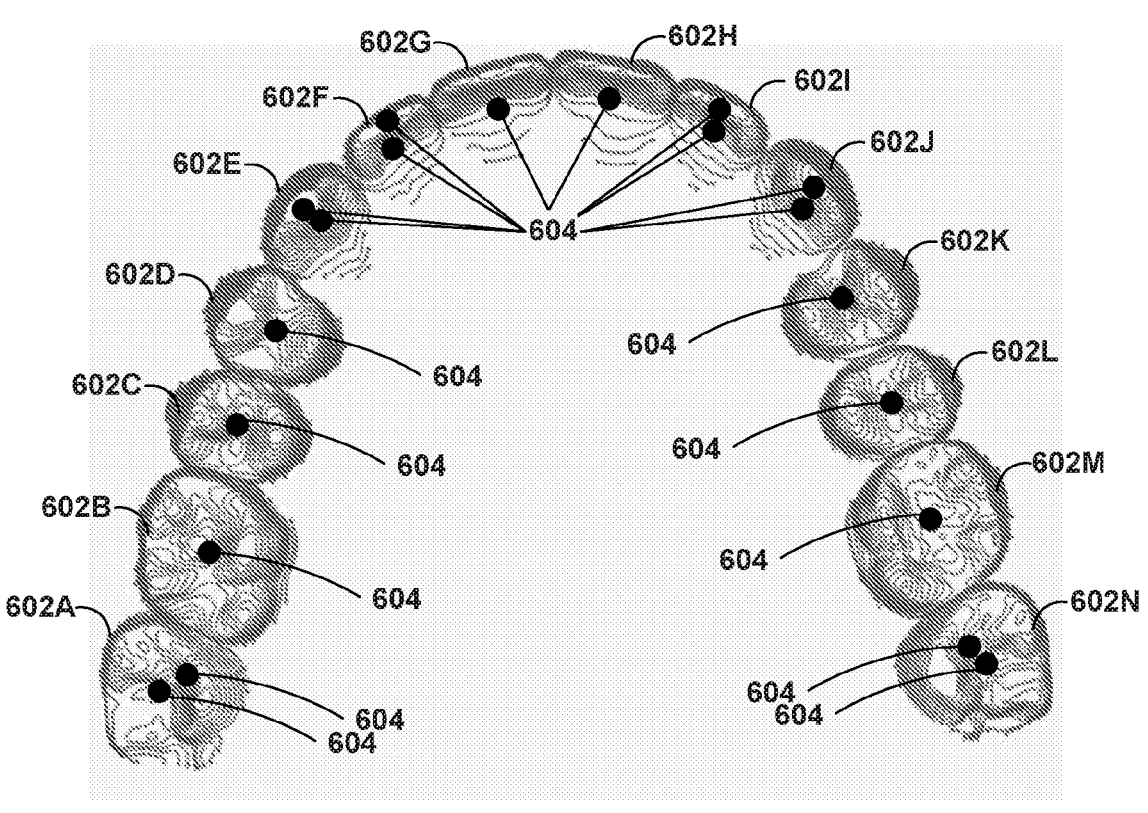
FIG. 6 is a conceptual diagram illustrating midpoints of a plurality of teeth, in accordance with various aspects of this disclosure.

FIG. 6 is a conceptual diagram illustrating midpoints of a plurality of teeth, in accordance with various aspects of this disclosure. FIG. 6 is described below in the context of system 100 of FIG. 1.

Landmark identifier 182 determines a midpoint 604 for each tooth 602A-602N (collectively, teeth 602) for each slice. In other words, where landmark identifier 182 divides the digital model into four slices, landmark identifier 182 determines four midpoints for each tooth of the digital model of the future dental anatomy. In some examples, midpoints 604 for a given tooth of teeth 602 may be substantially planar with one another. For example, as shown in FIG. 6, midpoints 604 for tooth 602B appear to be substantially stacked on top of one another. In some examples, midpoints 604 for different slices of the same tooth may be offset from one another. For instance, in the example of FIG. 6, midpoints 604 of tooth 602A are offset from one another. Similarly, as shown in FIG. 6, in some examples, midpoints 604 of the anterior teeth (e.g., teeth 602E-602J) may be offset from one another.

Landmark identifier 182 may determine the midpoint of a tooth for a particular slice by calculating the center of mass of constellation of points around the edge of a tooth. In another example, landmark identifier 182 determines the midpoint of a tooth for a particular slice based on a convex hull of the tooth for that particular slice. In such examples, landmark identifier 182 determines a geometric center from the convex hull by performing a flood-fill operation on the region circumscribed by the convex hull and computing a center of mass of the flood-filled convex hull.

Figure 7:
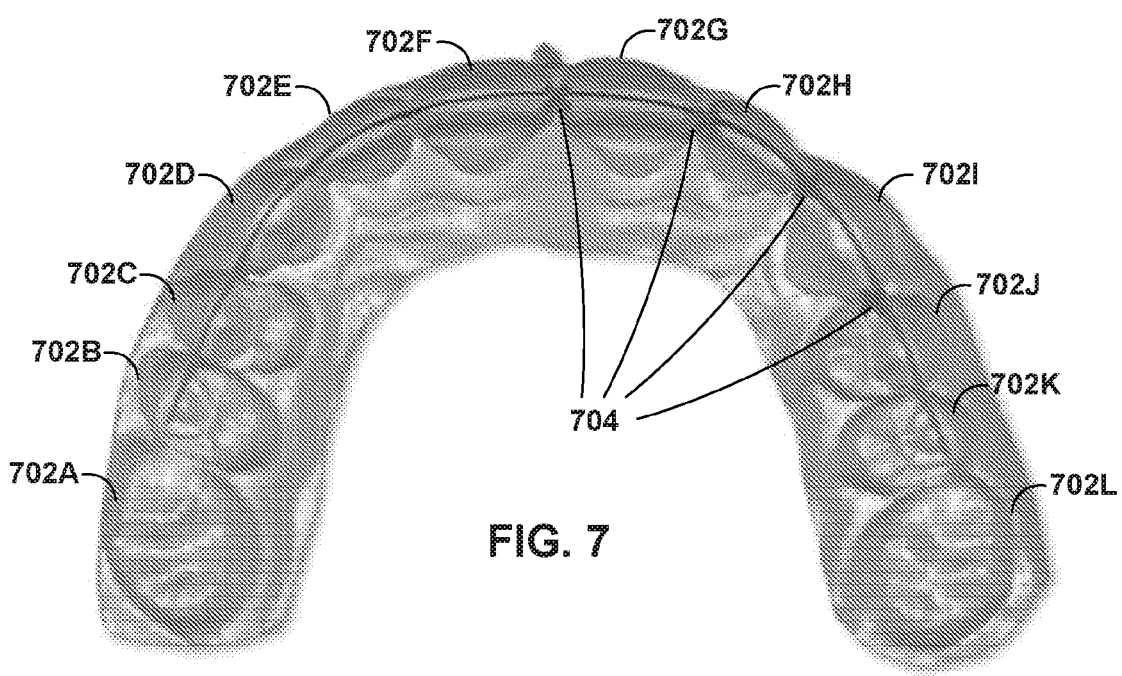
FIG. 7 is a conceptual diagram illustrating points between adjacent teeth, in accordance with various aspects of this disclosure.

FIG. 7 is a conceptual diagram illustrating points between adjacent teeth, in accordance with various aspects of this disclosure. FIG. 7 is described below in the context of system 100 of FIG. 1.

Digital model 700 of a patient's dental anatomy include teeth 702A-702L (collectively, teeth 702). In some examples, landmark identifier 182 determines a closest point 704 between a pair of adjacent teeth 702. Each of points 704 may be a point of closest approach or a point of contact between adjacent teeth. In one example, landmark identifier 182 determines a closest point 704 between a pair of adjacent teeth 702 for each slice of a plurality of slices. In another example, landmark identifier 182 determines the closest point 704 between adjacent teeth 702 based on the entirety of the adjacent teeth (e.g., without dividing the dental anatomy into slices).

Figure 8A:
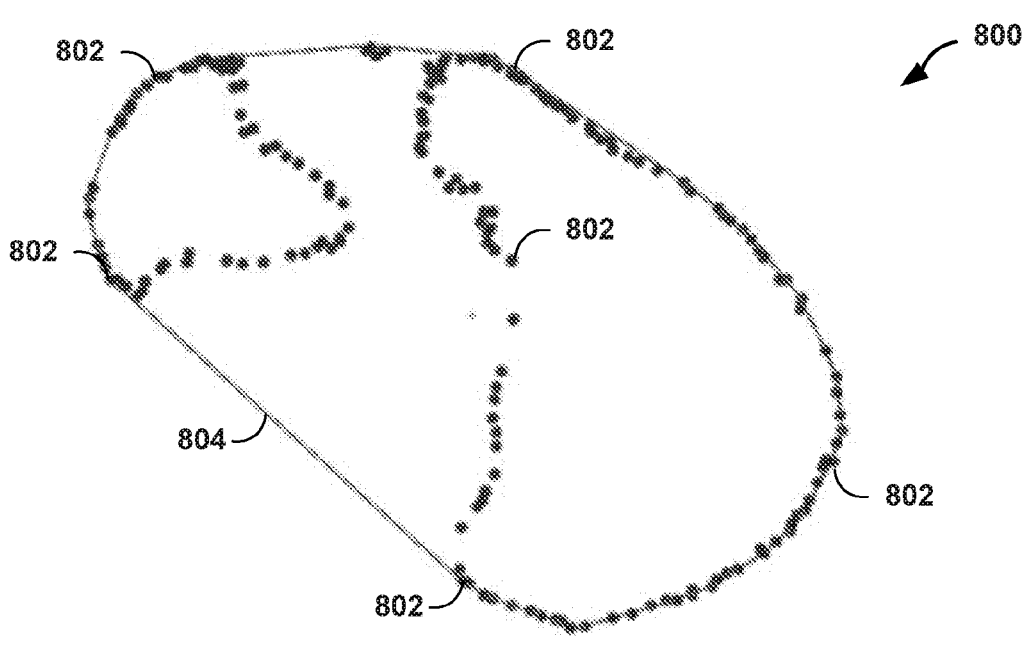
FIGS. 8A-8B are conceptual diagrams illustrating convex hulls, in accordance with various aspects of this disclosure.
Figure 8B:
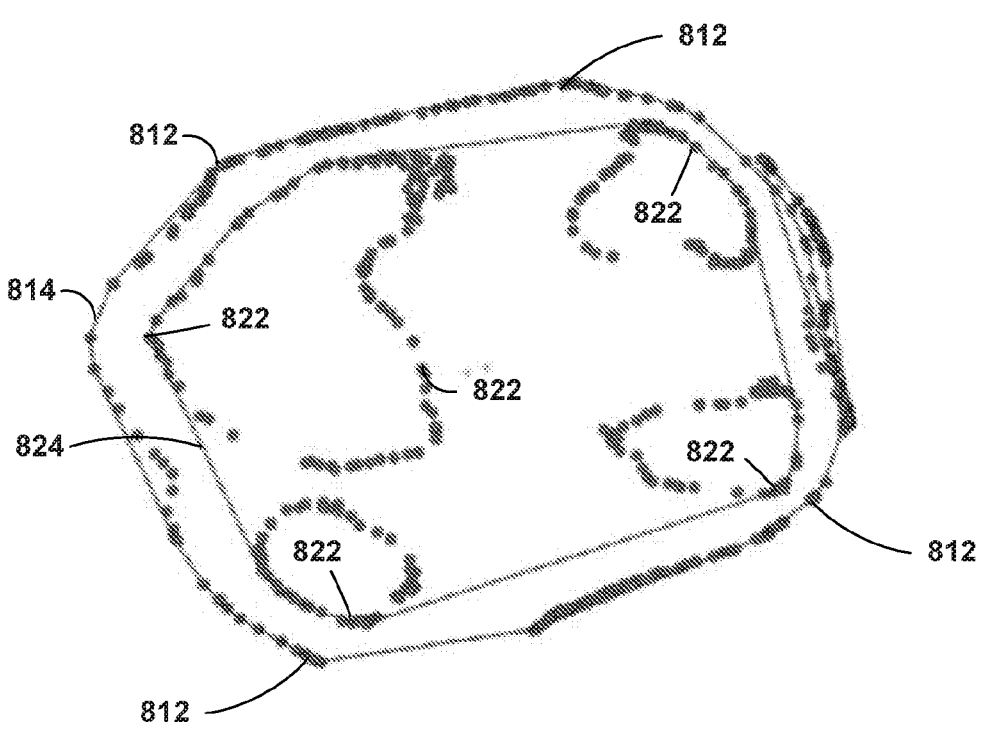

FIGS. 8A-8B are conceptual diagrams illustrating convex hulls, in accordance with various aspects of this disclosure. FIGS. 8A-8B is described below in the context of system 100 of FIG. 1.

FIG. 8A illustrates a single convex hull for a single slice of a digital model of the future dental anatomy. Landmark identification 182 determines, in some examples, a convex hull of a particular tooth for a particular slice. In one example, landmark identification 182 identifies a set of points that reside within a narrow delta of a given value of the Z-axis. For example, for a slice at Z=1.0, landmark identification 182 may identify all of the vertices 802 in a tooth mesh 800 that lie in the particular slice defined by values of Z between 0.8 and 1.0. Landmark identification 182 may examine the XY coordinates of vertices 802. For example, landmark identification 182 may identify the convex hull 804 of the particular tooth for a particular slice by identifying a subset of vertices of a given slice that circumscribe the entire set of vertices 802 for that slice. The number of vertices in a slice may depend on the thickness of the slice. For instance, the number of vertices for a slice of a tooth increases as the thickness of the z-axis for that slice increases. In some examples, cleaving part of a tooth for a given slice may create additional vertices for that slice of the tooth.

FIG. 8B illustrates a plurality of convex hulls that are each associated with a respective slice of a plurality of slices of a digital model of the future dental anatomy. In one example, a first slice includes vertices 812 that define a first convex hull 814 and a second slice includes vertices 822 that define a second convex hull 824.

Figure 9:
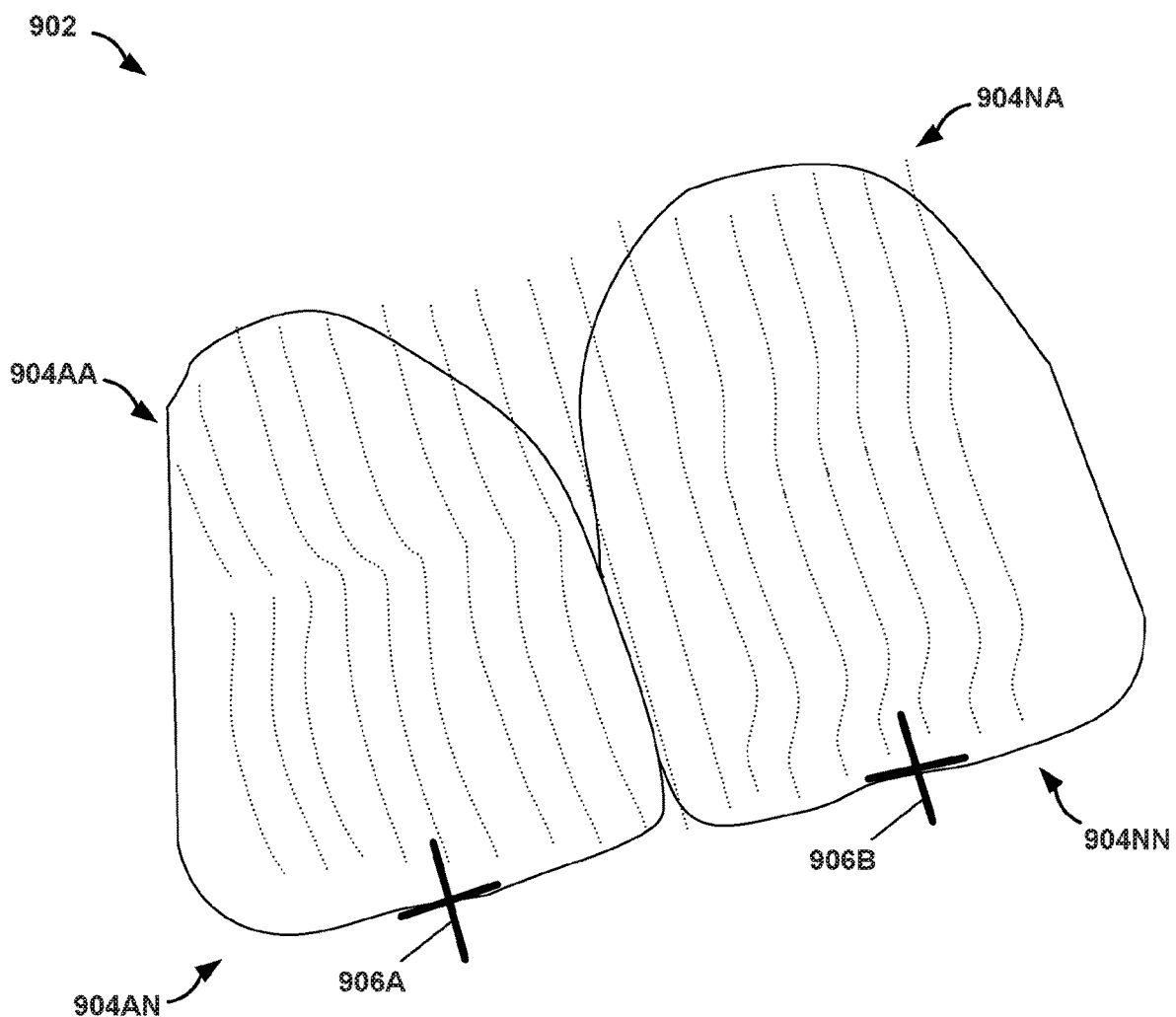
FIG. 9 is a conceptual diagram illustrating example splines, in accordance with various aspects of this disclosure.

FIG. 9 is a conceptual diagram illustrating example splines, in accordance with various aspects of this disclosure. FIG. 9 is described below in the context of system 100 of FIG. 1.

Custom feature generator 184 generates one or more custom appliance features. In the example of FIG. 9, custom feature generator 184 generates spline 902. Custom feature generator 184 may generate spline 902 by accumulating a plurality of points 904AA-904NN (collectively, points 904) for all of the slices of the future dental anatomy. Points 904 may include midpoints of each tooth and points between adjacent teeth (e.g., points of contact or points of closest approach). In one example, coordinate symbol 906A-906B illustrates the local coordinate system for each respective tooth.

Figure 10A:
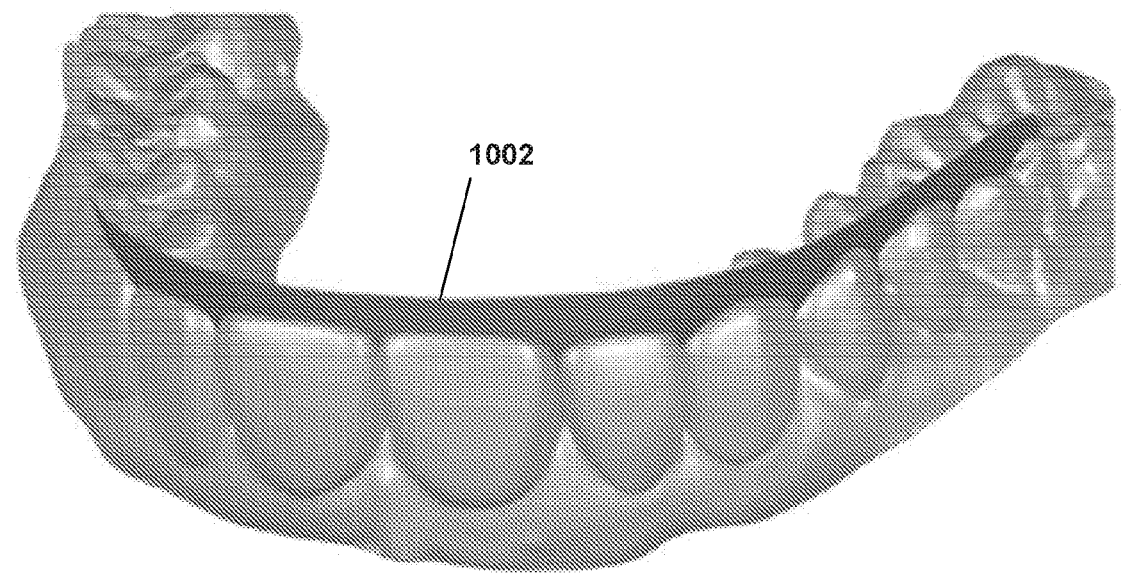
FIGS. 10A-10B are conceptual diagrams illustrating example mold parting surfaces, in accordance with various aspects of this disclosure.
Figure 10B:
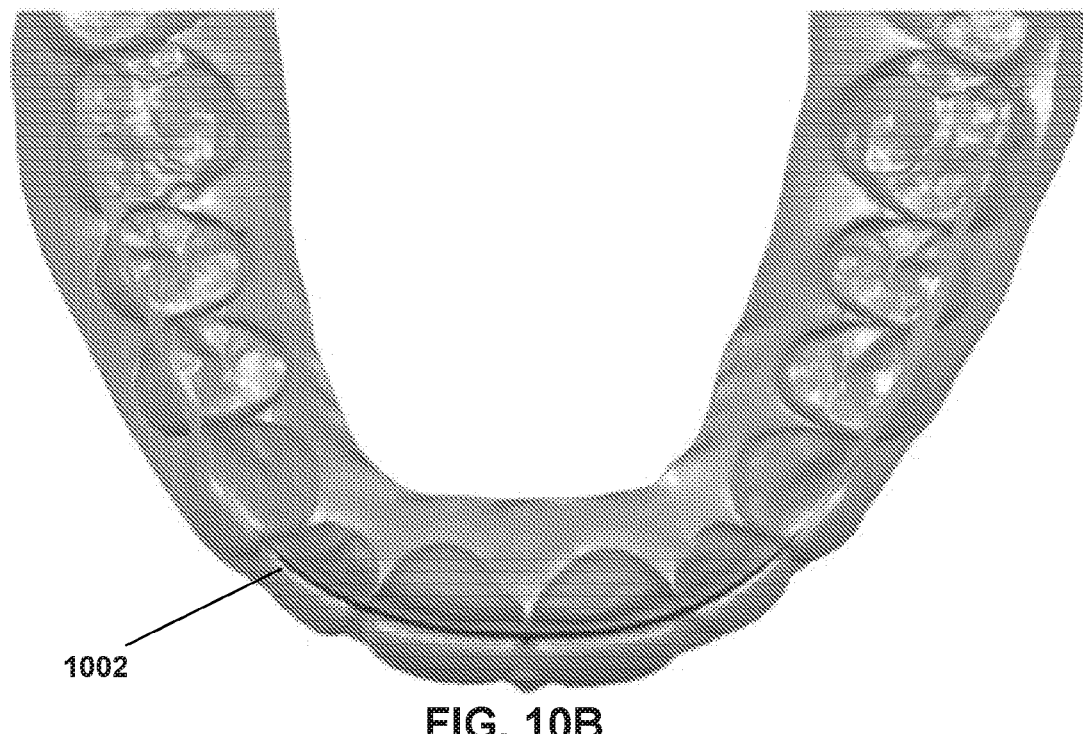

FIGS. 10A-10B are conceptual diagrams illustrating example mold parting surfaces, in accordance with various aspects of this disclosure. FIGS. 10A-10B are described below in the context of system 100 of FIG. 1.

Custom feature generator 184 automatically generates one or more custom appliance features for dental appliance 101 based on the landmarks. In one example, custom feature generator 182 generates a mold parting surface 1002 based on landmarks such as a midpoint of each tooth and points between adjacent teeth (e.g., points of contact between adjacent teeth and/or points of closest approach between adjacent teeth) for each slice. For example, custom feature generator 184 may generate one or more splines for each slice based on the midpoints and points between adjacent teeth for a respective slice, and may generate the mold parting surface based on the splines for all of the slices. In one example, custom feature generator 184 generates a coarsely-grained spline based on the midpoints and points between adjacent teeth.

In another example, custom feature generator 184 generates a finely-grained spline for each slice based on the coarsely-grained spline or splines for each slice. In such examples, custom feature generator 184 accumulates the points for all of the finely-grained splines across all of the slices. In other words, custom feature generator 184 aggregates the points for each of the splines to generate a 3D mesh for a mold parting surface 1002. Said yet another way, custom feature generator 184 may utilize each of the points (e.g., midpoints, points of closest approach, and/or points of contact) for each of the splines to create a 3D mesh of the mold parting surface 1002.

Figure 11:
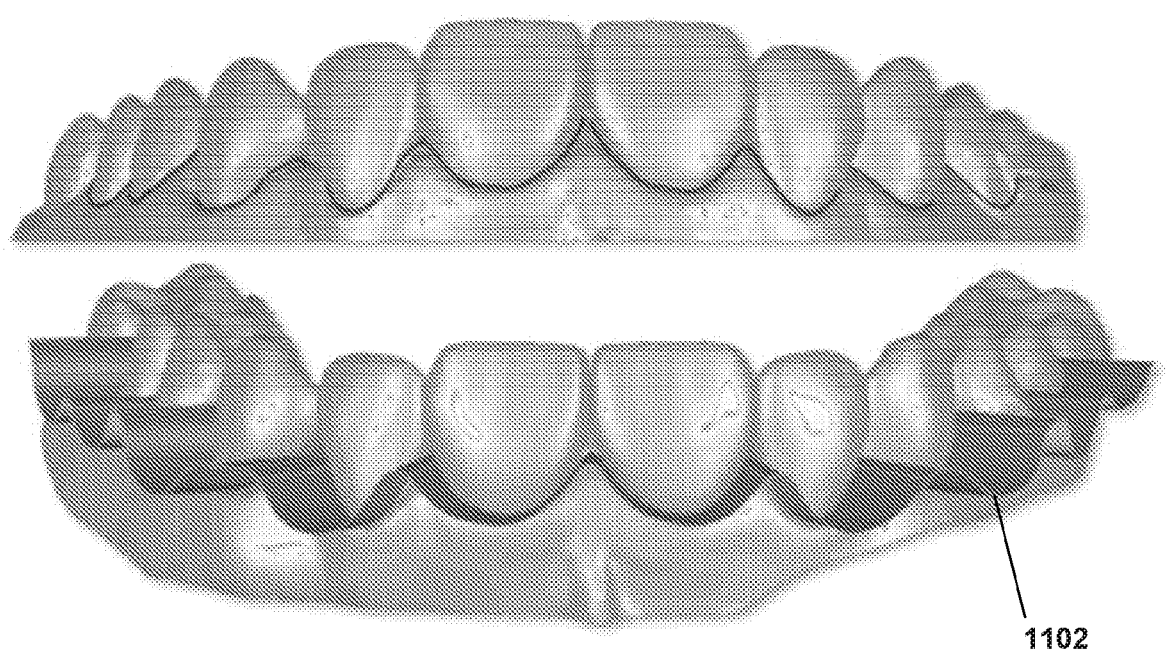
FIG. 11 is a conceptual diagram illustrating an example gingival trim surface, in accordance with various aspects of this disclosure.

FIG. 11 is a conceptual diagram illustrating an example gingival trim surface, in accordance with various aspects of this disclosure. Gingival trim surface 1102 may include a 3D mesh that trims an encompassing shell between gingiva 1104 and teeth 1106.

Figure 12:
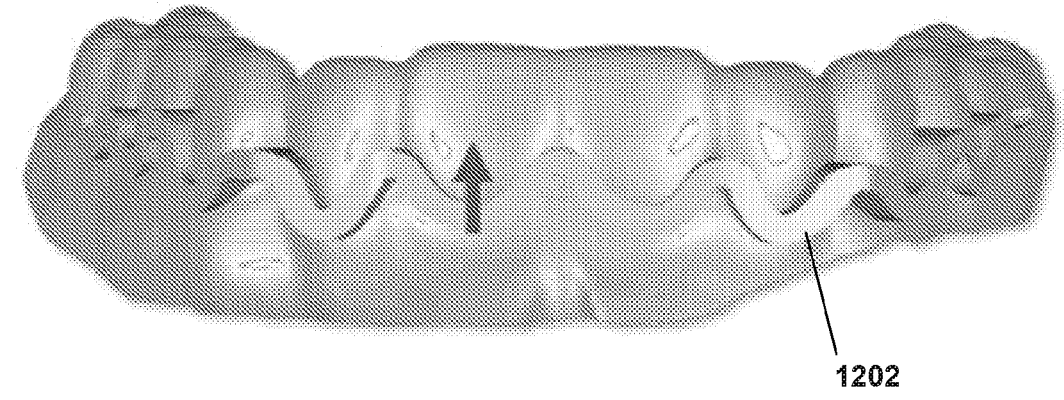
FIG. 12 is a conceptual diagram illustrating an example facial ribbon, in accordance with various aspects of this disclosure.

FIG. 12 is a conceptual diagram illustrating an example facial ribbon, in accordance with various aspects of this disclosure. Facial ribbon 1202 is a stiffening rib of nominal thickness that is offset facially from the shell. In some instances, the facial ribbon follows both the archform and the gingival margin. In one instance, the bottom of the facial ribbon falls no farther gingivally than the gingival trim surface.

Figure 13:
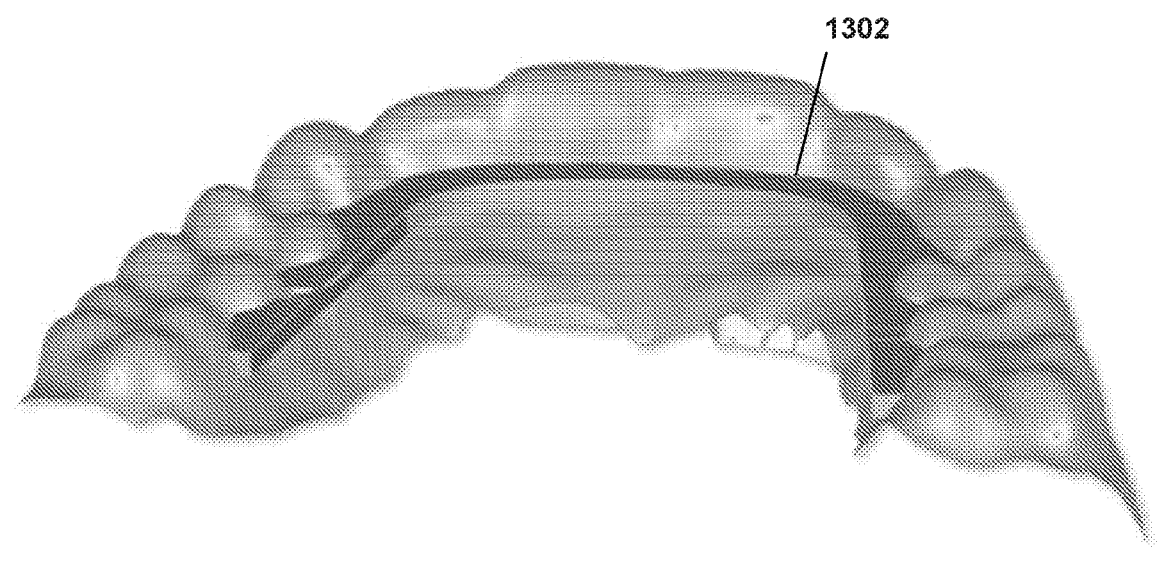
FIG. 13 is a conceptual diagram illustrating an example lingual shelf, in accordance with various aspects of this disclosure.

FIG. 13 is a conceptual diagram illustrating an example lingual shelf 1302, in accordance with various aspects of this disclosure. Lingual shelf 1302 is a stiffening rib of nominal thickness on the lingual side of the mold appliance, inset lingually and following the archform.

Figure 14:
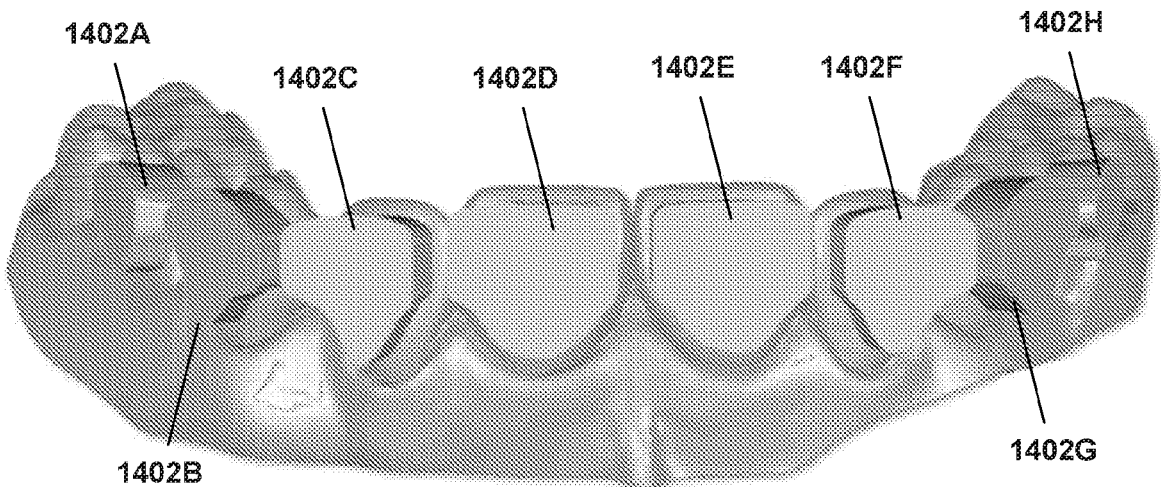
FIG. 14 is a conceptual diagram illustrating example doors and windows, in accordance with various aspects of this disclosure.

FIG. 14 is a conceptual diagram illustrating example doors and windows, in accordance with various aspects of this disclosure. Windows 1404A-1404H (collectively, windows 1404) includes an aperture that provide access to the tooth surface so that dental composite can be placed on the tooth. A door includes a structure that covers the window. The shape of the window may be defined as a nominal inset from the perimeter of the tooth when viewing the tooth facially. In some instances, the shape of the door corresponds to the shape of a window. The door may be inset to create clearance between the door and window.

Figure 15:
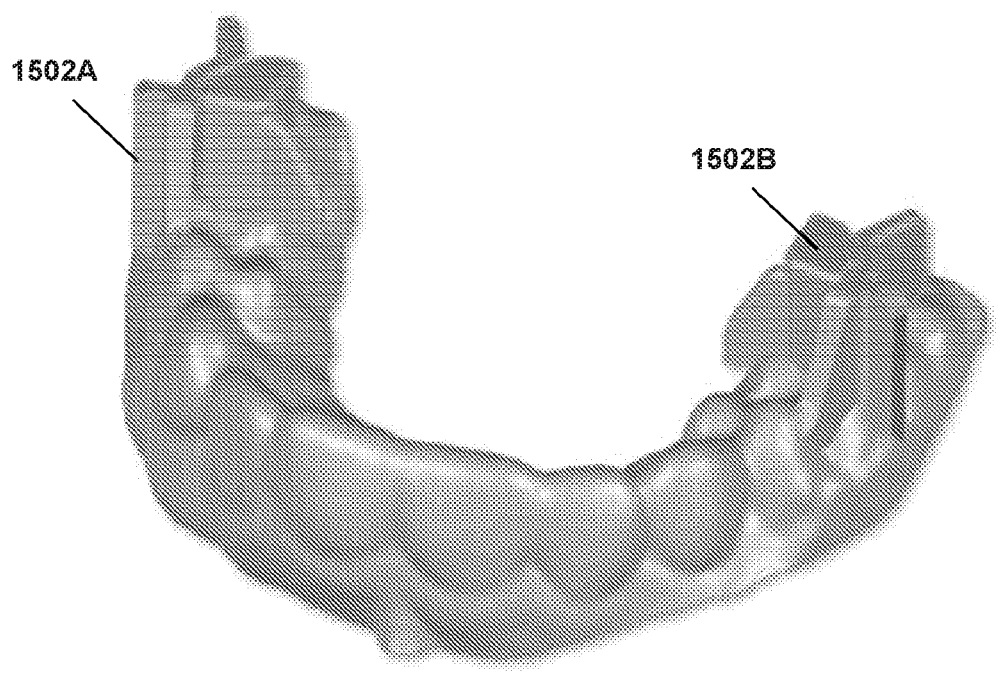
FIG. 15 is a conceptual diagram illustrating example rear snap clamps, in accordance with various aspects of this disclosure.

FIG. 15 is a conceptual diagram illustrating example rear snap clamps, in accordance with various aspects of this disclosure. FIG. 15 is described below in the context of system 100 of FIG. 1.

Feature manager 186 may determine one or more characteristics of rear snap clamps 1502A-1502B (collectively, rear snap clamps 1502). Rear snap clamps 150 may be configured to couple a facial portion of dental appliance 101 with a lingual portion of dental appliance 101. Example characteristics include size, shape, position, and/or orientation of the rear snap clamps. In one example, feature manager 186 determines the position of rear snap clamps 150 based on the position of the outer-most teeth to be restored. For example, manager 186 may position rear snap clamps along the archform on opposite ends of the archform (e.g., a first snap clamp at one end and a second snap clamp at another end). In some examples, feature manager 186 positions a female portion of the rear snap clamp on the lingual side of the parting surface and positions a male portion of the rear snap clamp on the facial side.

Figure 16:
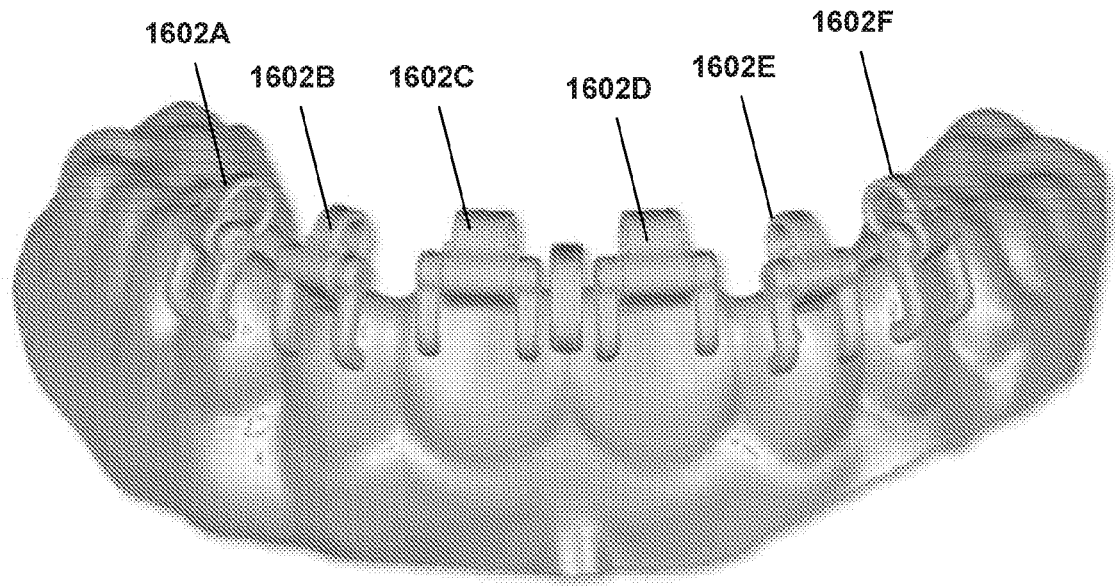
FIG. 16 is a conceptual diagram illustrating example door hinges, in accordance with various aspects of this disclosure.

FIG. 16 is a conceptual diagram illustrating example door hinges, in accordance with various aspects of this disclosure. FIG. 16 is described below in the context of system 100 of FIG. 1.

Feature manager 186 may determine one or more characteristics of door hinges 1602A-1602F (collectively, door hinges 1602). Door hinges 1602 may be configured to pivotably couple a door to dental appliance 101. Example characteristics include size, shape, position, and/or orientation of the door hinge 1602.

In one example, feature manager 186 determines the position of door hinges 1602 based on a position of another pre-defined appliance feature. For example, feature manager 186 may position each door hinge 1602 at the midline of a corresponding door. In one scenario, feature manager 186 positions the female portion of a door hinge 1602A to anchor to the facial portion of dental appliance 101 (e.g., towards the incisal edge of a tooth) and positions the male portion of the door hinge 1602A to anchor to the outer face of the door.

Figure 17A:
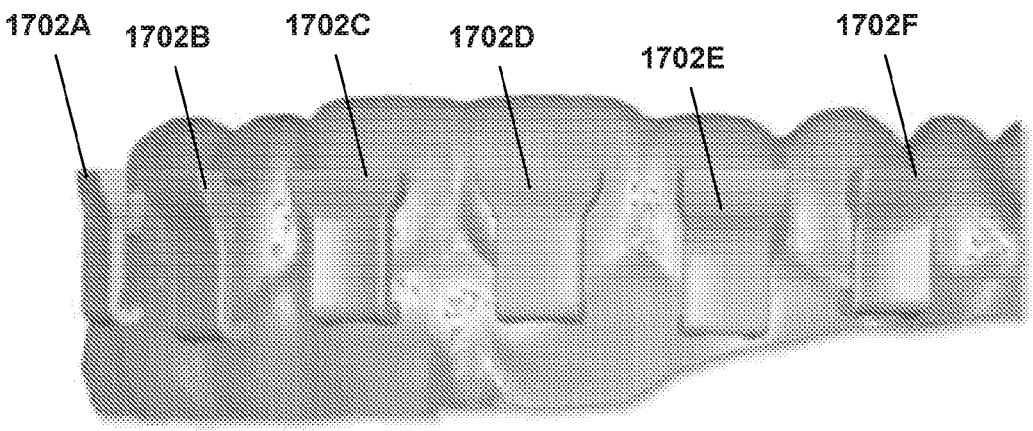
FIGS. 17A-17B are conceptual diagrams illustrating example door snaps, in accordance with various aspects of this disclosure.
Figure 17B:
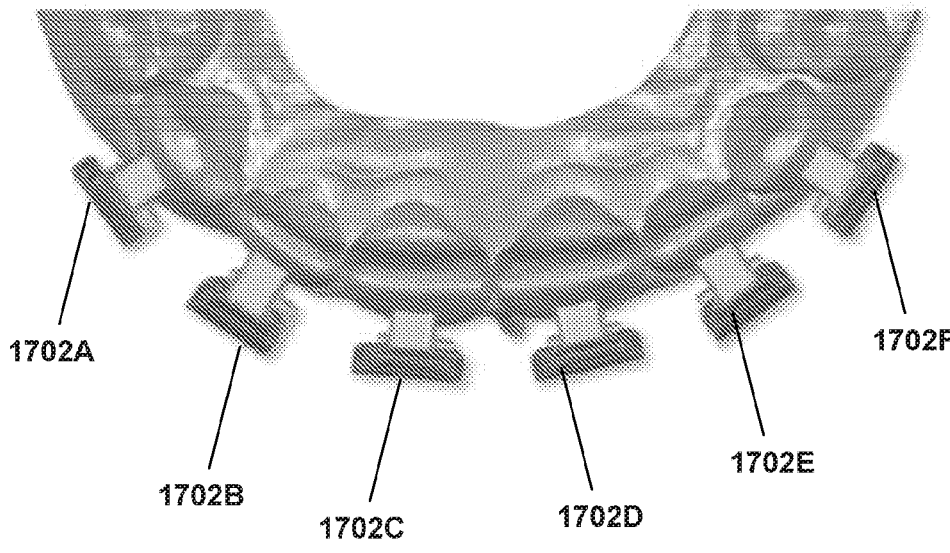

FIGS. 17A-18B are conceptual diagrams illustrating example door snaps, in accordance with various aspects of this disclosure. FIG. 17A-17B is described below in the context of system 100 of FIG. 1.

Feature manager 186 may determine one or more characteristics of door snaps 1702A-1702F (collectively, door snaps 1702). Example characteristics include size, shape, position, and/or orientation of the door snaps 1702.

In one example, feature manager 186 determines the position of door snaps 1702 based on a position of another pre-defined appliance feature. For example, feature manager 186 may position each door snap 1702 at the midline of a corresponding door. In one instance, feature manager 186 positions the female portion of the door snap to anchor to an outer face of the door and extends downward toward the gingiva. In another instance, feature manager 186 positions the male portion of the door snap to anchor to the gingival side of the facial ribbon.

Figure 18:
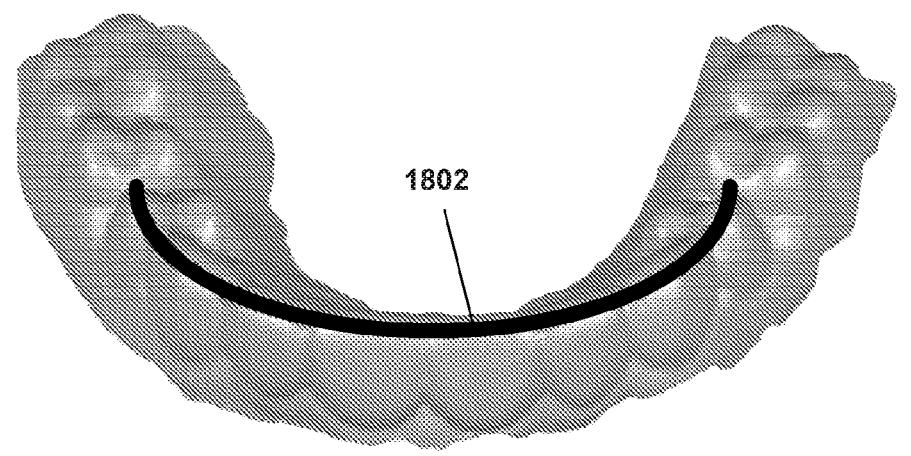
FIG. 18 is a conceptual diagram illustrating an example incisal ridge, in accordance with various aspects of this disclosure.

FIG. 18 is a conceptual diagram illustrating an example incisal ridge, in accordance with various aspects of this disclosure. Incisal ridge 1802 provides reinforcement at the incisal edge.

Figure 19:
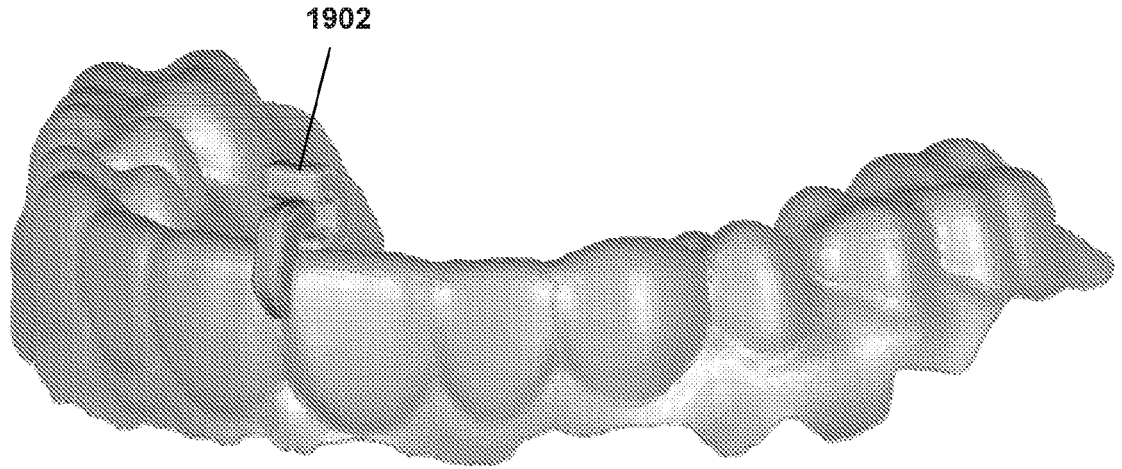
FIG. 19 is a conceptual diagram illustrating an example center clip, in accordance with various aspects of this disclosure.

FIG. 19 is a conceptual diagram illustrating an example center clip, in accordance with various aspects of this disclosure. Center clip 1902 aligns the facial portion and the lingual portion of the dental appliance with one another.

Figure 20:
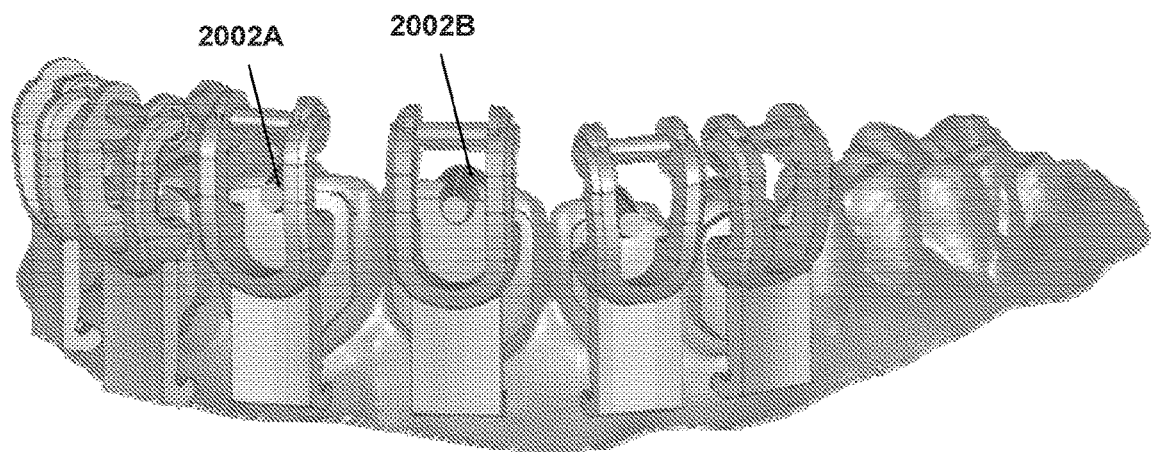
FIG. 20 is a conceptual diagram illustrating example door vents, in accordance with various aspects of this disclosure.

FIG. 20 is a conceptual diagram illustrating example door vents, in accordance with various aspects of this disclosure. Door vents 2002A-2002B (collectively, door vents 2002) transport excess dental composite out of the dental appliance.

Figure 21:
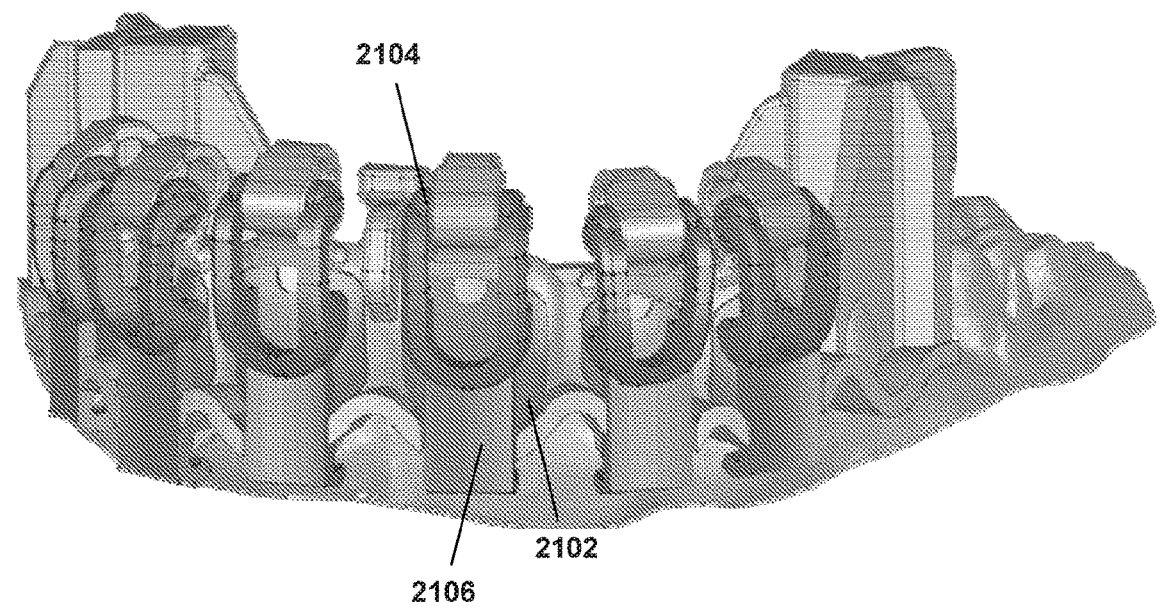
FIG. 21 is a conceptual diagram illustrating example doors, in accordance with various aspects of this disclosure.

FIG. 21 is a conceptual diagram illustrating example doors, in accordance with various aspects of this disclosure. In the example of FIG. 20, a dental appliance includes door 2102, door hinge 2104, and door snap 2106.

Figure 22:
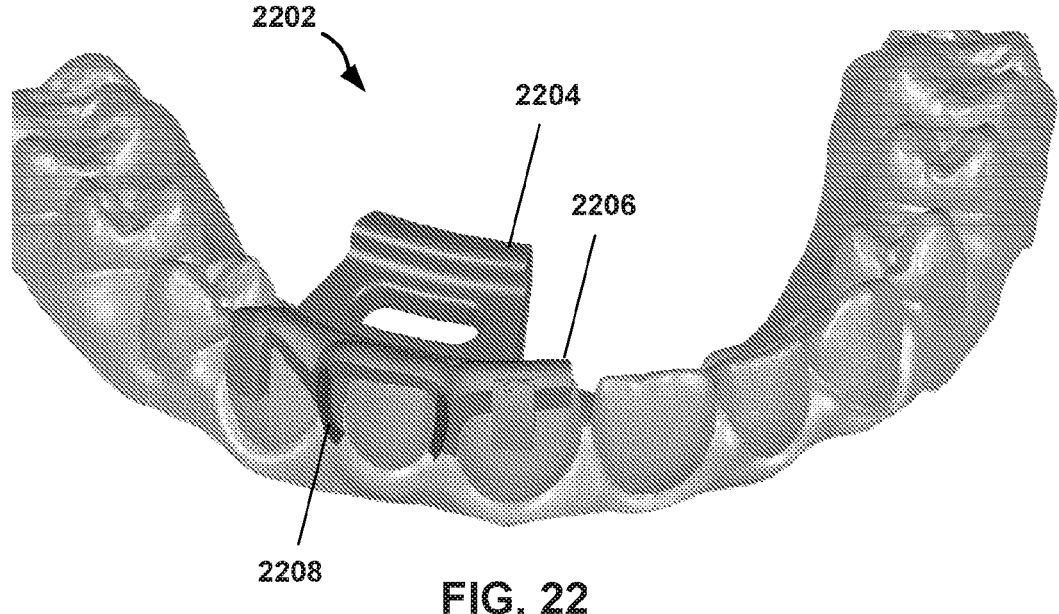
FIG. 22 is a conceptual diagram illustrating an example diastema matrix, in accordance with various aspects of this disclosure.

FIG. 22 is a conceptual diagram illustrating an example diastema matrix, in accordance with various aspects of this disclosure. Diastema matrix 2202 includes handle 2204, body 2206, and wrapping portion 2208. Wrapping portion 2208 is configured to fit in the interproximal region between two adjacent teeth.

Figure 23:
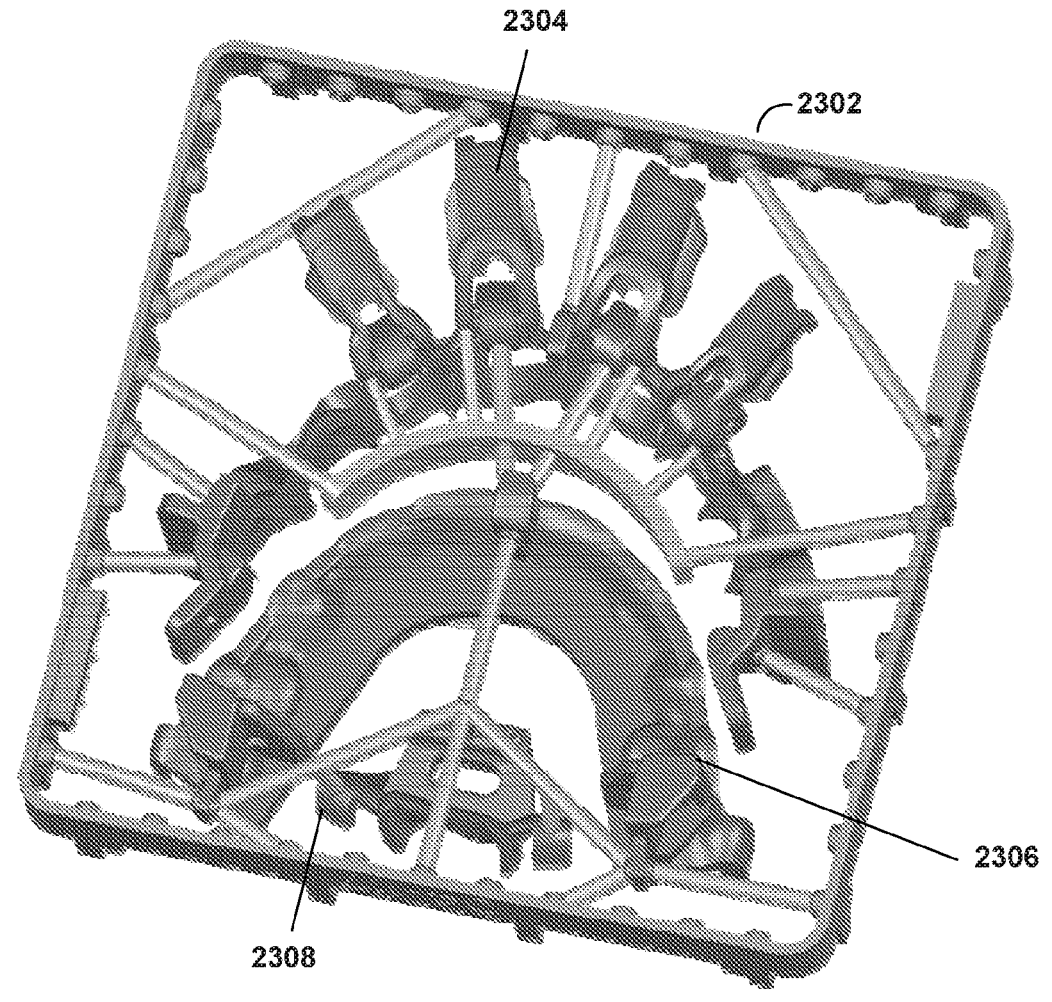
FIG. 23 is a conceptual diagram illustrating an example manufacturing case frame and an example dental appliance, in accordance with various aspects of this disclosure.

FIG. 23 is a conceptual diagram illustrating an example manufacturing case frame and an example dental appliance, in accordance with various aspects of this disclosure. Manufacturing case frame 2302 is configured to support one or more parts of a dental appliance. For example, the manufacturing case frame 2302 may detachably couple a lingual portion 2304 of a dental appliance, a facial portion 2306 of the dental appliance, and a diastema matrix 2308 to one another via case frame sparring 2310. In the example of FIG. 23, case frame sparring 2310 ties or couples the parts 2304, 2306, and 2308 of the dental appliance to the manufacturing case frame 2302.

Figure 24:
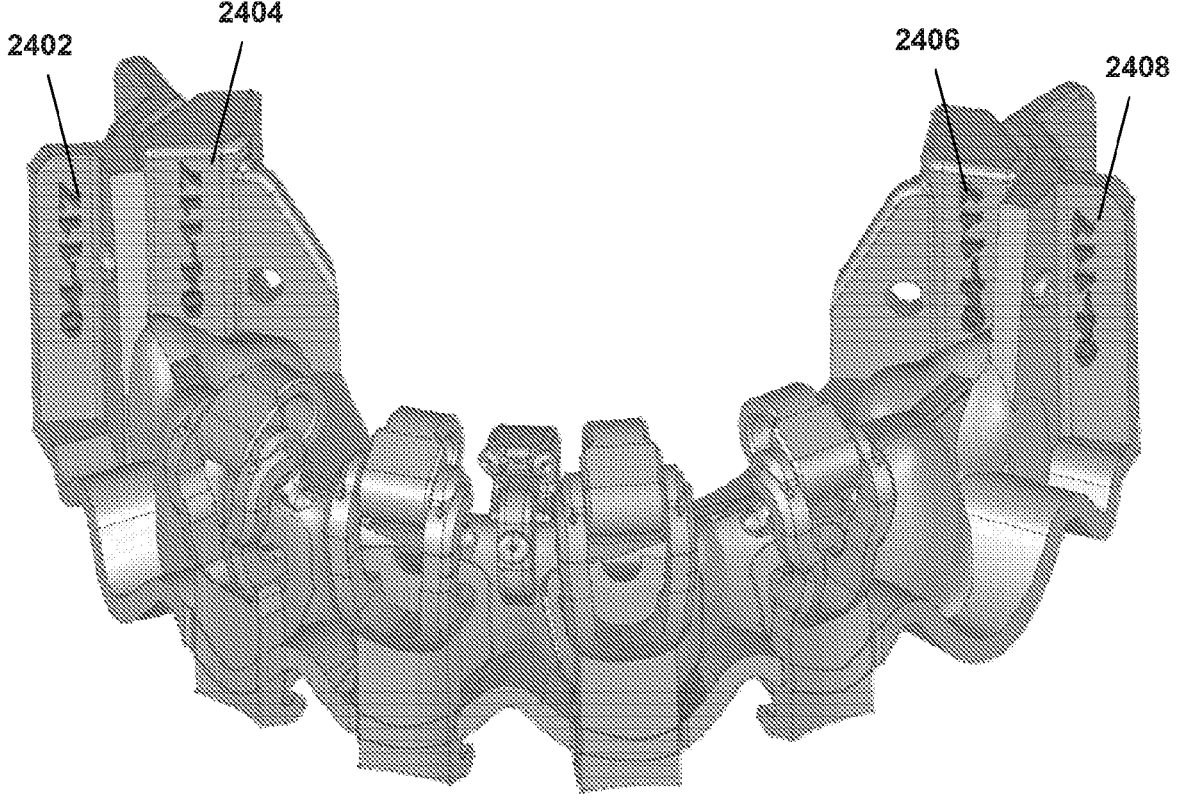
FIG. 24 is a conceptual diagram illustrating an example dental appliance including custom labels, in accordance with various aspects of this disclosure.

FIG. 24 is a conceptual diagram illustrating an example dental appliance including custom labels, in accordance with various aspects of this disclosure. Custom labels 2402-2408 may be printed on various parts of the dental appliance and includes data (e.g., a serial number, a part number, etc.) identifying a respective part of the dental appliance.

Various examples have been described. These and other examples are within the scope of the following claims.

What is claimed is:

1. A system comprising:
   one or more processors configured to obtain a digital three-dimensional (3D) model of a future dental anatomy of a patient, the future dental anatomy representing an intended shape of at least one tooth of the patient;
   a landmark identifier configured to automatically compute, based on the digital 3D model of the future dental anatomy of the patient, one or more landmarks of the future dental anatomy of the patient, wherein the landmark identifier is configured to identify a plurality of slices of the dental anatomy;
   a custom feature generator configured to automatically generate, based on the one or more landmarks, one or more custom appliance features for a dental appliance for restoring the at least one tooth of the patient wherein the custom appliance feature is a mold parting surface and the custom feature generator is configured to generate the mold parting surface by at least being configured to:
      generate a 3D mesh by accumulating a plurality of points for each respective slice of a plurality of slices of the dental anatomy; and
      determine, based on the 3D mesh, the mold parting surface;
   a memory device configured to store a digital model of the dental appliance, the digital model of the dental appliance including at least one of the one or more custom appliance features or one or more pre-defined appliance features; and
   an interface configured to output instructions that cause a manufacturing system to 3D print the dental appliance based on the digital model generated by the custom feature generator.

2. The system of claim 1, further comprising:
   a feature characteristics manager configured to automatically determine, based at least in part on the one or more landmarks, characteristics of the one or more pre-defined appliance features for the dental appliance, wherein the one or more pre-defined appliance features are configured to perform functionality of the dental appliance.

3. The system of claim 1, further comprising:
   a model assembler configured to automatically assemble the one or more custom appliance features and the one or more pre-defined appliance features into the digital model of the dental appliance.

4. The system of claim 1, wherein to automatically compute the one or more landmarks, the landmark identifier is further configured to determine a midpoint of the at least one tooth within each respective slice of the plurality of slices.

5. The system of claim 1, wherein the at least one tooth includes a first tooth and a second tooth, and wherein to automatically compute the one or more landmarks, the landmark identifier is further configured to determine a closest point between the first tooth and the second tooth within each respective slice of the plurality of slices.

6. The system of claim 1, wherein to automatically compute the one or more landmarks, the landmark identifier is further configured to compute a convex hull indicating an outer boundary of the at least one tooth within each respective slice of the plurality of slices.

7. The system of claim 1, wherein the landmark identifier is further configured to determine whether a particular slice of the plurality of slices is valid by at least being configured to:
   determine an area of a tooth for each respective slice within the plurality of slices;
   determine the largest area of the tooth across the plurality of slices;
   determine whether the particular slice is valid based at least in part on the area of the tooth for the particular slice and the largest area of the tooth across the plurality of slices.

8. The system of claim 1, wherein the landmark identifier is further configured to determine whether a particular slice of the plurality of slices is valid by at least being configured to:

determine a length of a segment of a convex hull for the particular slice of a tooth;

determine a length of a perimeter of the convex hull for the particular slice of the tooth;

determine whether the particular slice of the tooth is valid based on the length of the segment of the convex hull and the length of the perimeter of the convex hull.

9. The system of claim 1, wherein the one or more custom appliance features further includes at least one of a spline, a shell, a facial ribbon, a lingual shelf, a door, a mold parting surface, an incisal ridge, a case frame sparing, an aperture that provides access to the tooth surface so that dental composite can be placed on the tooth and a diastema matrix wrapping.

10. The system of claim 1, wherein the one or more custom appliance features includes a spline, and wherein the custom feature generator is configured to generate the spline by at least being configured to:

divide the digital 3D model into a plurality of slices;

identify a midpoint for each tooth for each slice of the plurality of slices;

identify a closest point between each set of adjacent teeth within each slice; and generate a spline for each slice based on at least one of the midpoint for each tooth for each slice or the closest point between each set of adjacent teeth within each slice.

11. The system of claim 1, wherein the feature characteristic manager is further configured to determine one or more characteristics of the one or more pre-defined appliance features based on one or more practitioner preferences.

12. The system of claim 1, wherein the feature characteristic manager is further configured to determine one or more characteristics of the one or more pre-defined appliance features based on feedback associated with a previously generated dental appliance.

13. A method comprising:

receiving, by a landmark identifier of a computing device, a digital three-dimensional (3D) model of a future dental anatomy of a patient, the future dental anatomy representing an intended shape of at least one tooth of the patient;

automatically computing, by the landmark identifier, based on the digital 3D model of the future dental anatomy of the patient, one or more landmarks of the future dental anatomy of the patient, wherein the landmark identifier is configured to identify a plurality of slices of the dental anatomy;

generating, based on the one or more landmarks, one or more custom appliance features for a dental appliance for restoring the at least one tooth of the patient wherein the custom appliance feature is a mold parting surface and the custom feature generator is configured to generate the mold parting surface by:

generating a 3D mesh by accumulating a plurality of points for each respective slice of a plurality of slices of the dental anatomy; and determining, based on the 3D mesh, the mold parting surface;

storing, at a memory of the computing device, a digital model of the dental appliance, the digital model of the dental appliance including at least one of the one or more custom appliance features or one or more pre-defined appliance features; and outputting instructions that cause a manufacturing system to 3D print the dental appliance based on the digital model generated by the custom feature generator.

14. The method of claim 13, further comprising:

automatically determining, by a feature characteristics manager of the computing device, based at least in part on the one or more landmarks, characteristics of the one or more pre-defined appliance features for the dental appliance, wherein the one or more pre-defined appliance features are configured to perform functionality of the dental appliance.

15. The method of claim 13, further comprising:

automatically assembling, by a model assembler of the computing device, the one or more custom appliance features and the one or more pre-defined appliance features into the digital model of the dental appliance.

16. The method of claim 13, wherein automatically computing the one or more landmarks of the future dental anatomy includes:

identifying, by the landmark identifier, a plurality of slices of the dental anatomy; and identifying a midpoint of the at least one tooth within each respective slice of the plurality of slices.

17. The method of claim 13, wherein the one or more custom appliance features further includes at least one of a spline, a shell, a facial ribbon, a lingual shelf, a door, a mold parting surface, an incisal ridge, a case frame sparing, an aperture that provides access to the tooth surface so that dental composite can be placed on the tooth and a diastema matrix wrapping.

18. The method of claim 13, wherein the landmark identifier is further configured to determine whether a particular slice of the plurality of slices is valid by performing the steps comprising:

determining an area of a tooth for each respective slice within the plurality of slices;

determining the largest area of the tooth across the plurality of slices;

determine whether the particular slice is valid based at least in part on the area of the tooth for the particular slice and the largest area of the tooth across the plurality of slices.

19. The method of claim 13, wherein the landmark identifier is further configured to determine whether a particular slice of the plurality of slices is valid by performing the steps comprising:

determining a length of a segment of a convex hull for the particular slice of a tooth;

determining a length of a perimeter of the convex hull for the particular slice of the tooth;

determining whether the particular slice of the tooth is valid based on the length of the segment of the convex hull and the length of the perimeter of the convex hull.

\* \* \* \* \*